US012666435B2

(12) United States Patent
Zhang et al.

(10) Patent No.:  US 12,666,435 B2
(45) Date of Patent:       Jun. 23, 2026

(54) FEEDBACK INFORMATION TRANSMITTING METHOD AND APPARATUS AND FEEDBACK INFORMATION RECEIVING METHOD AND APPARATUS

(71) Applicant: 1FINITY Inc., Kawasaki (JP)

(72) Inventors: Jian Zhang, Beijing (CN); Qinyan Jiang, Beijing (CN); Zhe Chen, Beijing (CN); Lei Zhang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 459 days.

(21) Appl. No.: 18/125,235

(22) Filed: Mar. 23, 2023

(65) Prior Publication Data

US 2023/0232411 A1      Jul. 20, 2023

Related U.S. Application Data

(63) Continuation      of      application      No. PCT/CN2020/121236, filed on Oct. 15, 2020.

(51) Int. Cl.
*H04W 72/23*          (2023.01)
*H04B 7/06*           (2006.01)
*H04L 5/00*           (2006.01)

(52) U.S. Cl.
CPC .......... *H04W 72/23* (2023.01); *H04B 7/0639* (2013.01); *H04L 5/0053* (2013.01)

(58) Field of Classification Search
CPC .. H04W 72/23; H04W 72/232; H04B 7/0639; H04L 5/0053; H04L 1/1887;

(Continued)

(56) References Cited

U.S. PATENT DOCUMENTS 11,831,445 B2 *  11/2023  Yang ..................... H04L 1/1896
2018/0324845 A1  11/2018  Wang et al.
(Continued)

FOREIGN PATENT DOCUMENTS

CN        110574319 A      12/2019
EP        4 138 499 A1      2/2023
(Continued)

OTHER PUBLICATIONS

International Search Report with the Written Opinion of the International Searching Authority issued by the China National Intellectual Property Administration for corresponding International Patent Application No. PCT/CN2020/121236, mailed on Jul. 9, 2021, with an English translation.

(Continued)

*Primary Examiner* — John D Blanton
(74) *Attorney, Agent, or Firm* — Myers Wolin, LLC

(57)                    ABSTRACT
An apparatus for transmitting feedback information, includes a receiver configured to receive downlink control information transmitted by a network device, and receive one or more physical downlink shared channels (PDSCHs) transmitted by the network device according to the downlink control information, and a transmitter configured to feed back feedback information for the physical downlink shared channels to the network device, wherein feedback information for physical downlink shared channels on a multi-PDSCH cell is included in two sub-codebooks, and one of the sub-codebooks includes feedback information for a physical downlink shared channel that is scheduled on a multi-PDSCH cell based on single-PDSCH and transport block.

17 Claims, 8 Drawing Sheets

(58) Field of Classification Search
CPC ....... H04L 5/0055; H04L 1/16; H04L 1/1854;
H04L 1/1861; H04L 5/001; H04L 1/1812
See application file for complete search history.

(56) References Cited

U.S. PATENT DOCUMENTS

| | | |
|---|---|---|
| 2020/0059327 A1 | 2/2020 | Kini et al. |
| 2020/0213981 A1 | 7/2020 | Park et al. |
| 2020/0322979 A1 | 10/2020 | Chatterjee et al. |
| 2022/0140954 A1* | 5/2022 | Kim ...................... H04L 1/1861 370/329 |
| 2022/0174707 A1* | 6/2022 | Kim ...................... H04W 72/23 |
| 2022/0174716 A1 | 6/2022 | Takeda et al. |
| 2023/0036012 A1* | 2/2023 | Chung ................. H04B 7/0695 |
| 2023/0134318 A1* | 5/2023 | Kang ................... H04W 72/232 370/329 |
| 2023/0171040 A1* | 6/2023 | Gao ...................... H04L 5/0044 370/329 |
| 2023/0198683 A1* | 6/2023 | Gao ................. H04W 72/1273 370/280 |
| 2023/0217456 A1* | 7/2023 | Yi ........................... H04L 5/001 370/329 |
| 2023/0232411 A1* | 7/2023 | Zhang ................... H04L 5/0053 |
| 2023/0262699 A1* | 8/2023 | Kusashima ........... H04L 5/0053 |
| 2023/0291509 A1* | 9/2023 | Baldemair ............ H04L 1/1861 |
| 2023/0299901 A1* | 9/2023 | Matsumura ........... H04W 16/28 370/330 |

FOREIGN PATENT DOCUMENTS

| | | |
|---|---|---|
| WO | 2020/141994 A1 | 7/2020 |
| WO | 2020/202429 A1 | 10/2020 |
| WO | 2020/204561 A1 | 10/2020 |

OTHER PUBLICATIONS

Panasonic, "HARQ enhancement for NR-U", Agenda Item: 7.2.2.2.3, 3GPP TSG-RAN WG1 Meeting #97s, R1-1906263, Reno, US, May 13-17, 2019.
Notice of Reasons for Refusal issued by the Japan Patent Office for corresponding Japanese Patent Application No. 2023-521053, mailed on Mar. 26, 2024, with an English translation.
The Extended European search report with the Supplementary European search report and the European search opinion, issued by the European Patent Office for corresponding European Patent Application No. 20957146.2-1213, mailed on Oct. 30, 2023.
Huawei et al., "HARQ enhancement in NR unlicensed", Agenda Item: 7.2.2.2.3, 3GPP TSG-RAN WG1 Meeting #99, R1-1911868, Reno, USA, Nov. 18-22, 2019.
Notice of Preliminary Rejection issued by the Korean Intellectual Property Office for corresponding Korean Patent Application No. 10-2023-7011832, mailed on Feb. 20, 2024, with an English translation.
Huawei et al., "Discussion on the remaining issues in RRC signaling", Agenda Item: 6.2.3.2, 3GPP TSG RAN WG2 #109, R2-2000964, Electronic, Feb. 24-Mar. 6, 2020, cited in JPOA.
Notification of Reasons for Refusal issued by the Japan Patent Office for corresponding Japanese Patent Application No. 2024-176186, mailed on Oct. 14, 2025, with an English translation.
The First Examination Report issued by the Indian Patent Office for corresponding Indian Patent Application No. 202337023728, mailed on May 17, 2024, with an English translation.

* cited by examiner

| Carrier configuration (carriers are independently configured) | HARQ-ACK-related parameters (configured for carriers independently) |
|---|---|
| Set C0: single-PDSCH carrier, scheduled based on a TB | $N_{TB\_max,c}$ |
| Set C1: single-PDSCH carrier, scheduled based on a CBG | $N_{TB\_max,c}$, $N_{CBG\_max\_TB,c}$ |
| Set C2: multi-PDSCH carrier, scheduled based on a TB | $N_{multi\_PDSCH\_max,c}$, $N_{TB\_max,c}$ |
| Set C3: multi-PDSCH carrier, scheduled based on a CBG | $N_{multi\_PDSCH\_max,c}$, $N_{TB\_max,c}$, $N_{CBG\_max\_TB,c}$ |

Fig. 3

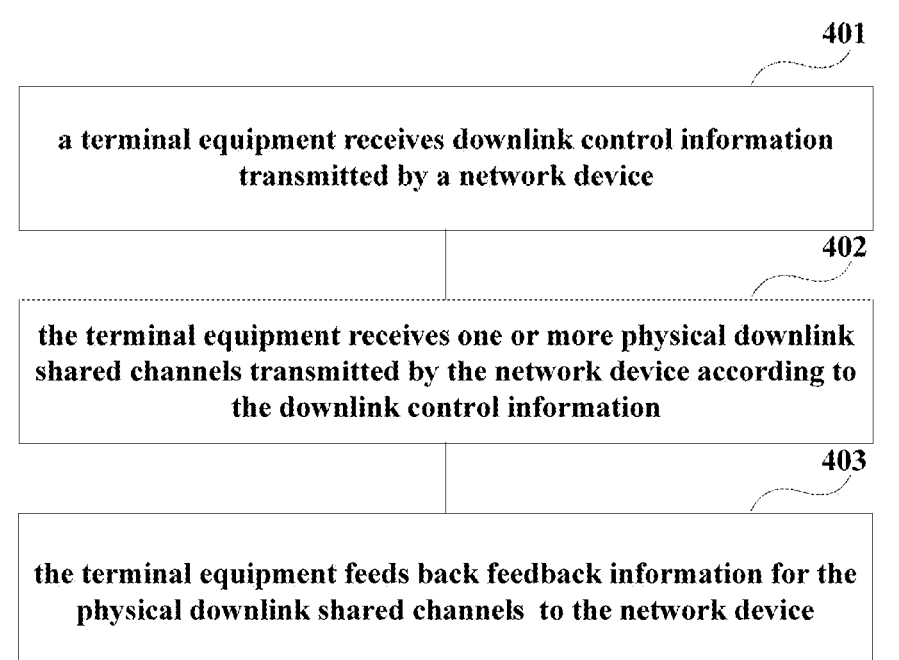

401 a terminal equipment receives downlink control information transmitted by a network device

402 the terminal equipment receives one or more physical downlink shared channels transmitted by the network device according to the downlink control information

403 the terminal equipment feeds back feedback information for the physical downlink shared channels to the network device

Fig. 4

| PDSCH scheduling to which the first sub-codebook is directed:<br>- scheduling in set C0<br>- scheduling in set C1 based on TB<br>- scheduling in set C2 based on single-PDSCH and TB<br>- scheduling in set C3 based on single-PDSCH and TB | Carrier configuration (carriers are independently configured) | Parameter $N_c$ for determining sub-codebook HARQ-ACK bit number |
|---|---|---|
| | Set C0: single-PDSCH carrier, scheduled based on a TB | $N_c = N_{TB\_max,c}$ |
| | Set C1: single-PDSCH carrier, scheduled based on a CBG | $N_c = N_{TB\_max,c}$ |
| HARQ-ACK bit number reserved for each time of scheduling: a maximum value max{$N_c$} of $N_c$ in sets C0, C1, C2, C3 | Set C2: multi-PDSCH carrier, scheduled based on a TB | $N_c = N_{TB\_max,c}$ |
| | Set C3: multi-PDSCH carrier, scheduled based on a CBG | $N_c = N_{TB\_max,c}$ |

Fig. 5

| PDSCH scheduling to which the second sub-codebook is directed:<br>- scheduling in set C1 based on a CBG<br>- scheduling in set C3 based on single-PDSCH and CBG | Carrier configuration (carriers are independently configured) | Parameter $N_c$ for determining sub-codebook HARQ-ACK bit number |
|---|---|---|
| | Set C0: single-PDSCH carrier, scheduled based on a TB | |
| | Set C1: single-PDSCH carrier, scheduled based on a CBG | $N_c = N_{TB\_max,c} \times N_{CBG\_max\_TB,c}$ |
| HARQ-ACK bit number reserved for each time of scheduling: a maximum value max{$N_c$} of $N_c$ in sets C1, C3 | Set C2: multi-PDSCH carrier, scheduled based on a TB | |
| | Set C3: multi-PDSCH carrier, scheduled based on a CBG | $N_c = N_{TB\_max,c} \times N_{CBG\_max\_TB,c}$ |

Fig. 6

| PDSCH scheduling to which the third sub-codebook is directed:<br>- scheduling in set C2 based on multi-PDSCH and TB<br>- scheduling in set C3 based on multi-PDSCH | Carrier configuration (carriers are independently configured) | Parameter $N_c$ for determining sub-codebook HARQ-ACK bit number |
|---|---|---|
| | Set C0: single-PDSCH carrier, scheduled based on a TB | |
| | Set C1: single-PDSCH carrier, scheduled based on a CBG | |
| HARQ-ACK bit number reserved for each time of scheduling: a maximum value max{$N_c$} of $N_c$ in sets C2, C3 | Set C2: multi-PDSCH carrier, scheduled based on a TB | $N_c = N_{multi\_PDSCH\_max,c} \times N_{TB\_max,c}$ |
| | Set C3: multi-PDSCH carrier, scheduled based on a CBG | $N_c = N_{multi\_PDSCH\_max,c} \times N_{TB\_max,c} \times N_{CBG\_max\_TB,c}$ |

Fig. 7

PDSCH scheduling to which the second sub-codebook is directed:
- scheduling in set C1 based on CBG
- scheduling in set C2 based on multi-PDSCH and TB
- scheduling based on single-PDSCH and CBG and scheduling based on multi-PDSCH in set C3

HARQ-ACK bit number reserved for each time of scheduling: a maximum value max{$N_c$} of $N_c$ in sets C1, C2, C3

| Carrier configuration (carriers are independently configured) | Parameter $N_c$ for determining sub-codebook HARQ-ACK bit number |
|---|---|
| Set C0: single-PDSCH carrier, scheduled based on a TB | |
| Set C1: single-PDSCH carrier, scheduled based on a CBG | $N_c = N_{TB\_max,c} \times N_{CBG\_max\_TB,c}$ |
| Set C2: multi-PDSCH carrier, scheduled based on a TB | $N_c = N_{MultiPDSCH\_max,c} \times N_{TB\_max,c}$ |
| Set C3: multi-PDSCH carrier, scheduled based on a CBG | $N_c = N_{MultiPDSCH\_max,c} \times N_{TB\_max,c} \times N_{CBG\_max\_TB,c}$ |

Fig. 8

PDSCH scheduling to which the second sub-codebook is directed:
- scheduling in set C1 based on CBG HARQ-ACK bit number reserved for each time of scheduling: a maximum value max{$N_c$} of $N_c$ in set C1

| Carrier configuration (carriers are independently configured) | Parameter $N_c$ for determining sub-codebook HARQ-ACK bit number |
|---|---|
| Set C0: single-PDSCH carrier, scheduled based on a TB | |
| Set C1: single-PDSCH carrier, scheduled based on a CBG | $N_c = N_{TB\_max,c} \times N_{CBG\_max\_TB,c}$ |
| Set C2: multi-PDSCH carrier, scheduled based on a TB | |
| Set C3: multi-PDSCH carrier, scheduled based on a CBG | |

Fig. 9

PDSCH scheduling to which the third sub-codebook is directed:
- scheduling in set C2 based on multi-PDSCH and TB
- scheduling based on single-PDSCH and CBG and scheduling based on multi-PDSCH in set C3

HARQ-ACK bit number reserved for each time of scheduling: a maximum value max{$N_c$} of $N_c$ in sets C2, C3

| Carrier configuration (carriers are independently configured) | Parameter $N_c$ for determining sub-codebook HARQ-ACK bit number |
|---|---|
| Set C0: single-PDSCH carrier, scheduled based on a TB | |
| Set C1: single-PDSCH carrier, scheduled based on a CBG | |
| Set C2: multi-PDSCH carrier, scheduled based on a TB | $N_c = N_{MultiPDSCH\_max,c} \times N_{TB\_max,c}$ |
| Set C3: multi-PDSCH carrier, scheduled based on a CBG | $N_c = N_{MultiPDSCH\_max,c} \times N_{TB\_max,c} \times N_{CBG\_max\_TB,c}$ |

Fig. 10

PDSCH scheduling to which the first sub-codebook is directed:
- scheduling in set C0
- scheduling in set C1 based on a TB HARQ-ACK bit number reserved for each time of scheduling: a maximum value max{$N_c$} of $N_c$ in sets C0, C1

| Carrier configuration (carriers are independently configured) | Parameter $N_c$ for determining sub-codebook HARQ-ACK bit number |
|---|---|
| Set C0: single-PDSCH carrier, scheduled based on a TB | $N_c=N_{TB\_max,c}$ |
| Set C1: single-PDSCH carrier, scheduled based on a CBG | $N_c=N_{TB\_max,c}$ |
| Set C2: multi-PDSCH carrier, scheduled based on a TB | |
| Set C3: multi-PDSCH carrier, scheduled based on a CBG | |

Fig. 11

PDSCH scheduling to which the second sub-codebook is directed:
- scheduling in set C1 based on a CBG HARQ-ACK bit number reserved for each time of scheduling: a maximum value max{$N_c$} of $N_c$ in set C1

| Carrier configuration (carriers are independently configured) | Parameter $N_c$ for determining sub-codebook HARQ-ACK bit number |
|---|---|
| Set C0: single-PDSCH carrier, scheduled based on a TB | |
| Set C1: single-PDSCH carrier, scheduled based on a CBG | $N_c=N_{TB\_max,c}\times N_{CBG\_max\_TB,c}$ |
| Set C2: multi-PDSCH carrier, scheduled based on a TB | |
| Set C3: multi-PDSCH carrier, scheduled based on a CBG | |

Fig. 12

PDSCH scheduling to which the third sub-codebook is directed:
- scheduling in set C2
- scheduling in set C3

HARQ-ACK bit number reserved for each time of scheduling: a maximum value max{$N_c$} of $N_c$ in sets C2, C3

| Carrier configuration (carriers are independently configured) | Parameter $N_c$ for determining sub-codebook HARQ-ACK bit number |
|---|---|
| Set C0: single-PDSCH carrier, scheduled based on a TB | |
| Set C1: single-PDSCH carrier, scheduled based on a CBG | |
| Set C2: multi-PDSCH carrier, scheduled based on a TB | $N_c=N_{multi\_PDSCH\_max,c}\times N_{TB\_max,c}$ |
| Set C3: multi-PDSCH carrier, scheduled based on a CBG | $N_c=N_{multi\_PDSCH\_max,c}\times N_{TB\_max,c}\times N_{CBG\_max\_TB,c}$ |

Fig. 13

| PDSCH scheduling to which the first sub-codebook is directed:<br>- scheduling in set C0<br>- scheduling in set C1 based on TB<br>- scheduling in set C2<br>- scheduling in set C3 based on TB<br><br>HARQ-ACK bit number reserved for each time of scheduling: a maximum value max{$N_c$} of $N_c$ in sets C0, C1, C2, C3 | Carrier configuration (carriers are independently configured) | Parameter $N_c$ for determining sub-codebook HARQ-ACK bit number |
|---|---|---|
| | Set C0: single-PDSCH carrier, scheduled based on a TB | $N_c = N_{TB\_max,c}$ |
| | Set C1: single-PDSCH carrier, scheduled based on a CBG | $N_c = N_{TB\_max,c}$ |
| | Set C2: multi-PDSCH carrier, scheduled based on a TB | $N_c = N_{multi\_PDSCH\_max,c} \times N_{TB\_max,c}$ |
| | Set C3: multi-PDSCH carrier, scheduled based on a CBG | $N_c = N_{multi\_PDSCH\_max,c} \times N_{TB\_max,c}$ |

Fig. 14

| PDSCH scheduling to which the second sub-codebook is directed:<br>- scheduling in set C1 based on CBG<br>- scheduling in set C3 based on CBG<br><br>HARQ-ACK bit number reserved for each time of scheduling: a maximum value max{$N_c$} of $N_c$ in sets C1, C3 | Carrier configuration (carriers are independently configured) | Parameter $N_c$ for determining sub-codebook HARQ-ACK bit number |
|---|---|---|
| | Set C0: single-PDSCH carrier, scheduled based on a TB | |
| | Set C1: single-PDSCH carrier, scheduled based on a CBG | $N_c = N_{multi\_PDSCH\_max,c} \times N_{TB\_max,c}$ |
| | Set C2: multi-PDSCH carrier, scheduled based on a TB | |
| | Set C3: multi-PDSCH carrier, scheduled based on a CBG | $N_c = N_{multi\_PDSCH\_max,c} \times N_{TB\_max,c} \times N_{CBG\_max\_TB,c}$ |

Fig. 15

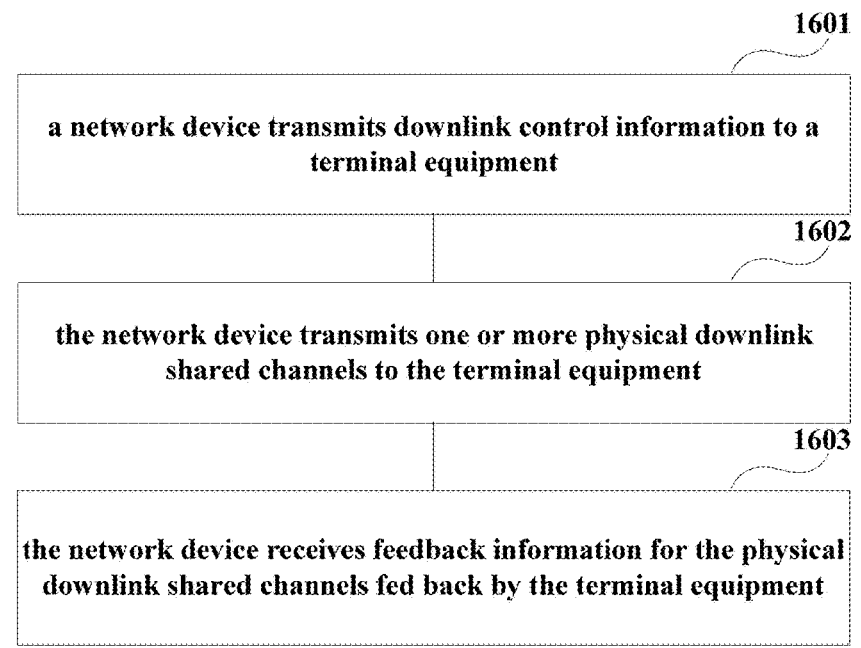

1601
a network device transmits downlink control information to a terminal equipment 1602
the network device transmits one or more physical downlink shared channels to the terminal equipment 1603
the network device receives feedback information for the physical downlink shared channels fed back by the terminal equipment

FEEDBACK INFORMATION TRANSMITTING METHOD AND APPARATUS AND FEEDBACK INFORMATION RECEIVING METHOD AND APPARATUS

CROSS-REFERENCE TO RELATED APPLICATION

This application is a continuation application of International Application PCT/CN2020/121236 filed on Oct. 15, 2020 and designated the U.S., the entire contents of which are incorporated herein by reference.

TECHNICAL FIELD

This disclosure relates to the field of communication technologies.

BACKGROUND

For New Radio (NR) Rel-15 and Rel-16, due to the support of FR2 frequencies, a maximum subcarrier spacing (SCS) of a physical downlink control channel (PDCCH)/physical downlink shared channel (PDSCH) may reach 120 kHz.

For NR Rel-15 and Rel-16, a piece of downlink control information (DCI) is only able to schedule one PDSCH (hereinafter referred to as single-PDSCH scheduling). A terminal equipment may feed back feedback information of PDSCHs scheduled by one or more pieces of DCI in a period of time, the feedback information being, for example, a hybrid automatic repeat request (HARD) codebook, which may also be referred to as an HARQ-ACK or an HARQ-ACK codebook.

Support for higher frequencies (52.6 GHz-71 GHz) is currently under studying in NR Rel-17. Higher frequencies need additional support for larger SCSs (greater than 120 kHz), which means shorter slot lengths. Due to the limitation of processing capabilities, a processing time of the terminal equipment cannot be reduced proportionally with the slot length. Therefore, processing requirements of terminal equipments operating at higher frequencies are somewhat relaxed compared with those operating at lower frequencies. For example, a terminal equipment cannot blindly detect PDCCHs too frequently. In this case, there may be more slots between two adjacent PDCCH blind detection occasions, which reduces scheduling occasions for a certain terminal equipment to some extent.

It should be noted that the above description of the background art is merely provided for clear and complete explanation of this disclosure and for easy understanding by those skilled in the art. And it should not be understood that the above technical solution is known to those skilled in the art as it is described in the background art of this disclosure.

SUMMARY

In order to provide more timely PDSCH scheduling, support for multi-PDSCH scheduling is under studying in NR Rel-17. For the multi-PDSCH scheduling, one piece of DCI is able to schedule more than one PDSCHs. For terminal equipments operating at higher frequencies (e.g. 52.6 GHz-71 GHz), supporting the multi-PDSCH scheduling is conducive to achieving a compromise between PDSCH scheduling flexibility and processing capabilities of equipments, and can reduce DCI scheduling overhead.

Therefore, multi-PDSCH scheduling may become a new feature supported when operating at 52.6 GHz-71 GHz.

However, it was found by the inventors that NR Rel-15 and Rel-16 standards do not provide support for multi-PDSCH scheduling. Currently, how to generate and transmit feedback information (such as a Type 2 HARQ-ACK codebook) for multi-PDSCH scheduling is still an open issue.

Addressed to at least one of the above problems, embodiments of this disclosure provide methods and apparatuses for transmitting and receiving feedback information.

According to an aspect of the embodiments of this disclosure, there is provided a method for transmitting feedback information, including:

receiving, by a terminal equipment, downlink control information transmitted by a network device;

receiving one or more physical downlink shared channels transmitted by the network device according to the downlink control information; and feeding back feedback information for the physical downlink shared channels to the network device;

wherein feedback information for physical downlink shared channels on a multi-PDSCH carrier is included in at least two sub-codebooks, and one of the sub-codebooks includes feedback information for the following physical downlink shared channel that: the physical downlink shared channel is scheduled on a multi-PDSCH carrier based on single-PDSCH and transport block.

According to another aspect of the embodiments of this disclosure, there is provided an apparatus for transmitting feedback information, including:

a receiving unit configured to receive downlink control information transmitted by a network device, and receive one or more physical downlink shared channels (PDSCHs) transmitted by the network device according to the downlink control information; and a transmitting unit configured to feed back feedback information for the physical downlink shared channels to the network device;

wherein feedback information for physical downlink shared channels on a multi-PDSCH carrier is included in at least two sub-codebooks, and one of the sub-codebooks includes feedback information for the following physical downlink shared channel that: the physical downlink shared channel is scheduled on a multi-PDSCH carrier based on single-PDSCH and transport block.

According to a further aspect of the embodiments of this disclosure, there is provided a method for receiving feedback information, including:

transmitting downlink control information by a network device to a terminal equipment;

transmitting one or more physical downlink shared channels to the terminal equipment; and receiving feedback information for the physical downlink shared channels fed back by the terminal equipment;

wherein feedback information for physical downlink shared channels on a multi-PDSCH carrier is included in at least two sub-codebooks, and one of the sub-codebooks includes feedback information for the following physical downlink shared channel: the physical downlink shared channel is scheduled on a multi-PDSCH carrier based on single-PDSCH and transport block.

According to still another aspect of the embodiments of this disclosure, there is provided an apparatus for receiving feedback information, including:

a transmitting unit configured to transmit downlink control information to a terminal equipment, and transmit one or more physical downlink shared channels to the terminal equipment; and a receiving unit configured to receive feedback information for the physical downlink shared channels fed back by the terminal equipment;

wherein feedback information for physical downlink shared channels on a multi-PDSCH carrier is included in at least two sub-codebooks, and one of the sub-codebooks includes feedback information for the following physical downlink shared channel: the physical downlink shared channel is scheduled on a multi-PDSCH carrier based on single-PDSCH and transport block.

According to yet another aspect of the embodiments of this disclosure, there is provided a communication system, including:

a network device configured to transmit downlink control information to a terminal equipment, transmit one or more physical downlink shared channels to the terminal equipment, and receive feedback information for the physical downlink shared channels fed back by the terminal equipment; and the terminal equipment configured to receive the downlink control information transmitted by the network device, receive the physical downlink shared channels transmitted by the network device according to the downlink control information, and feed back feedback information for the physical downlink shared channels to the network device;

wherein feedback information for physical downlink shared channels on a multi-PDSCH carrier is included in at least two sub-codebooks, and one of the sub-codebooks includes feedback information for the following physical downlink shared channel: the physical downlink shared channel is scheduled on a multi-PDSCH carrier based on single-PDSCH and transport block.

An advantage of the embodiments of this disclosure exists in that for carriers enabling multi-PDSCH scheduling, multiple sub-codebooks are generated based on whether to use the multi-PDSCH scheduling and/or whether to use a code block group (CBG) transmission, etc. Hence, not only feedback based on multi-PDSCH may be supported, but also a size of a Type 2 HARQ-ACK codebook may be reduced and feedback overhead of HARQ-ACK may be lowered by dividing sub-codebooks.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

FIG. 3 is an exemplary diagram of carrier aggregation of an embodiment of this disclosure;

FIG. 4 is a schematic diagram of the method for transmitting feedback information of an embodiment of this disclosure;

FIG. 5 is an exemplary diagram of a first sub-codebook of an embodiment of this disclosure;

FIG. 6 is an exemplary diagram of a second sub-codebook of an embodiment of this disclosure;

FIG. 7 is an exemplary diagram of a third sub-codebook of an embodiment of this disclosure;

FIG. 8 is another exemplary diagram of the second sub-codebook of the embodiment of this disclosure;

FIG. 9 is a further exemplary diagram of the second sub-codebook of the embodiment of this disclosure;

FIG. 10 is another exemplary diagram of the third sub-codebook of the embodiment of this disclosure;

FIG. 11 is another exemplary diagram of the first sub-codebook of the embodiment of this disclosure;

FIG. 12 is still another exemplary diagram of the second sub-codebook of the embodiment of this disclosure;

FIG. 13 is a further exemplary diagram of the third sub-codebook of the embodiment of this disclosure;

FIG. 14 is a further exemplary diagram of the first sub-codebook of the embodiment of this disclosure;

FIG. 15 is yet another exemplary diagram of the second sub-codebook of the embodiment of this disclosure;

FIG. 16 is a schematic diagram of the method for receiving feedback information of an embodiment of this disclosure;

DETAILED DESCRIPTION

Figure 1:
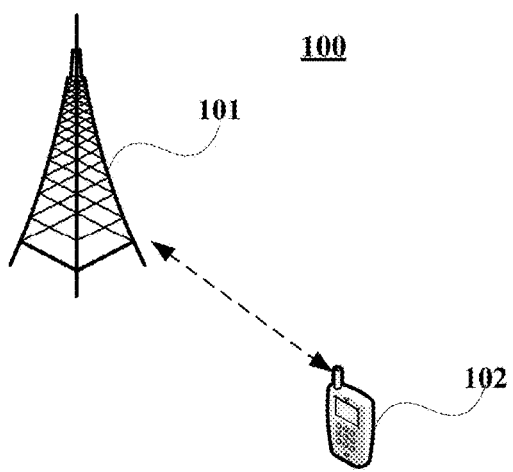
FIG. 1 is schematic diagram of a communication system of an embodiment of this disclosure.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to a device in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico, etc.). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" or "terminal equipment (TE) or terminal device" refers to, for example, an equipment accessing to a communication network via the network device and receiving network services. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above. In this text, "a device" may refer to a network device, or may refer to a terminal equipment.

Scenarios in the embodiments of this disclosure shall be described below by way of examples; however, this disclosure is not limited thereto.

FIG. 1 is a schematic diagram of a communication system of an embodiment of this disclosure, in which a case where a terminal equipment and a network device are taken as examples is schematically shown. As shown in FIG. 1, the communication system 100 may include a network device 101 and a terminal equipment 102. For the sake of simplicity, an example having only one terminal equipment and one network device is schematically given in FIG. 1; however, the embodiment of this disclosure is not limited thereto, and there may be multiple terminal equipments.

In the embodiment of this disclosure, existing traffics or traffics that may be implemented in the future may be performed between the network device 101 and the terminal equipment 102. For example, such traffics may include but not limited to enhanced mobile broadband (eMBB), massive machine type communication (MTC), and ultra-reliable and low-latency communication (URLLC), etc.

NR Rel-15 and Rel-16 provide support for a Type 2 HARQ-ACK codebook, and a downlink assignment index (DAI) mechanism may be used to dynamically determine the number of fed back HARQ-ACK bits. The Type 2 HARQ-ACK codebook is a dynamic HARQ-ACK codebook, and a terminal equipment generates the Type 2 HARQ-ACK codebook according to a counter DAI and a total DAI indicated by DCI.

Figure 2A:
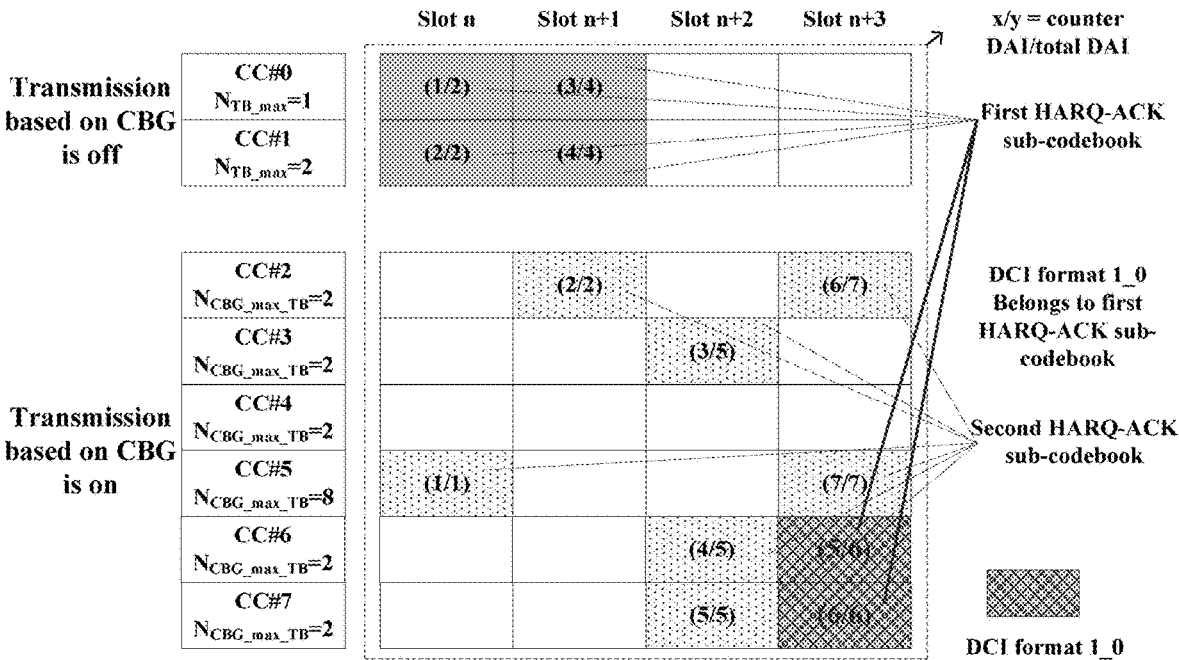
FIG. 2A is an exemplary diagram of dynamically determining feedback information by using DAI of an embodiment of this disclosure.

FIG. 2A is an exemplary diagram of dynamically determining feedback information by using DAI of an embodiment of this disclosure, schematic illustrating the Type 2 HARQ-ACK codebook. The counter DAI continuously counts carriers and DCI, and the total DAI indicates a total number of DCI accumulated at a current slot.

As shown in FIG. 2A, the Type 2 HARQ-ACK codebook consists of two sub-codebooks, which correspond to TB-based transmission and CBG-based transmission respectively. Here, "TB-based transmission" is equivalent to not enabling "CBG-based transmission". The counter DAI and total DAI are counted independently in the sub-codebook. For the sake of explanation, the counter DAI and total DAI in FIG. 2A indicate absolute values of counting.

In each sub-codebook, the number of HARQ-ACK bits scheduled by the DCI each time is determined according to a maximum number of HARQ-ACK bits in all carriers included in the sub-codebook. Here, "a carrier included in the sub-codebook" means that the carrier is able to generate feedback information in the sub-codebook, or the sub-codebook includes feedback information for the carrier. CC denotes a component carrier in carrier aggregation. $N_{TB\_max}$ denotes a maximum number of TBs that the carrier is able to support, and $N_{CBG\_max\_TB}$ denotes a maximum number of CBGs that each TB of the carrier is able to support.

As shown in FIG. 2A, a first sub-codebook includes HARQ-ACK for six times of scheduling, and as a maximum number of HARQ-ACK bits is 2, total 12 bits of HARQ-ACK are needed; and a second sub-codebook includes HARQ-ACK for seven times of scheduling, and as a maximum number of HARQ-ACK bits is 8, total 56 bits of HARQ-ACK are needed. Here, the first sub-codebook includes feedback information for the following PDSCH, wherein the PDSCH is scheduled by fallback DCI (DCI format 1_0) on a carrier enabling CBG-based transmission. A final Type 2 HARQ-ACK codebook is obtained by cascading two sub-codebooks, including total 68 bits of HARQ-ACK.

NR Rel-15 and Rel-16 standards do not provide support for multi-PDSCH scheduling. Currently, how to generate and transmit feedback information (such as Type 2 HARQ-ACK codebook) for multi-PDSCH scheduling is still an open issue.

For the type 2 HARQ-ACK codebook, miss-detection of DCI by the terminal equipment will lead to inconsistent understanding of the size of the codebook by the terminal equipment and the network device. To avoid this problem, the type 2 HARQ-ACK codebook generates HARQ-ACK for each carrier according to the maximum number of HARQ-ACK bits in the carrier, and the extra HARQ-ACK bits are set to be NACK.

Figure 2B:
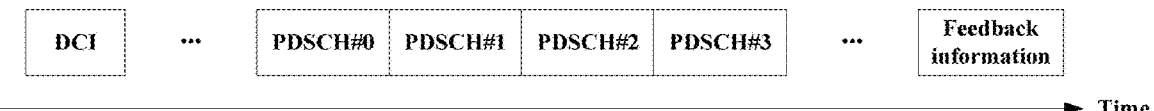
FIG. 2B is an exemplary diagram of multi-PDSCH scheduling of an embodiment of this disclosure.

FIG. 2B is an exemplary diagram of the multi-PDSCH scheduling of the embodiment of this disclosure. As shown in FIG. 2B, one piece of DCI schedules multiple PDSCHs (such as PDSCH #0, PDSCH #1, PDSCH #2 . . . ), and feedback information for multiple PDSCHs is transmitted to the network device at the same time.

Due to the introduction of the multi-PDSCH, the terminal equipment needs to feed back HARQ-ACK for multiple PDSCHs at the same time, hence, the maximum number of HARQ-ACK bits may increase exponentially. Generation of HARQ-ACK according to the maximum number of HARQ-ACK bits will lead to a significant increase in the number of bits of type 2 HARQ-ACK codebook, thereby increasing feedback overhead.

In the embodiments of this disclosure, the multi-PDSCH carrier is a carrier that is enabled a function of scheduling multiple PDSCHs by one piece of DCI (multi-PDSCH function), and the single-PDSCH carrier is a carrier that is disabled the function of scheduling multiple PDSCHs by one piece of DCI. The carrier in the embodiments of this disclosure may be replaced by a component carrier (CC), a serving cell, a cell, and so on, and this disclosure is not limited thereto.

In the embodiments of this disclosure, a carrier is a multi-PDSCH carrier or a single-PDSCH carrier. For the multi-PDSCH carrier, one piece of DCI may schedule one or more PDSCHs; and for the single-PDSCH carrier, one piece of DCI may only schedule one PDSCH. A PDSCH may carry one or more TBs. According to NR standards, a PDSCH may carry up to two TBs.

In the embodiments of this disclosure, how to determine whether a carrier is a multi-PDSCH carrier is not limited.

For example, it may be determined according to a time domain resource allocation table configured by radio resource control (RRC) or system information block (SIB). For a carrier, if a row in the table is able to indicate time domain resources and/or mapping types of multiple PDSCHs, such as indicating multiple start and length indicator values (SLIVs) and/or mapping types, the carrier is a multi-PDSCH carrier; otherwise, the carrier is a single-PDSCH carrier.

For another example, it may be determined according to a DCI format supported by the carrier. If the supported DCI format includes multiple new data indicators (NDIs) and/or redundancy version (RV) fields, the carrier is a multi-PDSCH carrier; otherwise, the carrier is a single-PDSCH carrier.

For another example, it may be determined according to a multi-PDSCH parameter configured by the RRC. If a carrier is configured with the multi-PDSCH parameter, it means that the carrier enables the multi-PDSCH function, and the carrier is a multi-PDSCH carrier; otherwise, the carrier is a single-PDSCH carrier.

In the embodiments of this disclosure, the scheduling based on multi-PDSCH refers to that one piece of DCI schedules more than one PDSCHs; and the scheduling based on single-PDSCH refers to that one piece of DCI schedules one PDSCH. A single-PDSCH carrier is only able to support the scheduling based on single-PDSCH, and the multi-PDSCH carrier is able to support the scheduling based on multi-PDSCH, and is also able to support the scheduling based on single-PDSCH. Suppose that a piece of DCI schedules a PDSCH on carrier c, the DCI may be from carrier c, and may also be from other carriers different than carrier c (cross-carrier scheduling).

In the embodiments of this disclosure, "the scheduling based on multi-PDSCH" may be replaced with "scheduling by means of multi-PDSCH", and "the scheduling based on single-PDSCH" may be replaced with "scheduling by means of single-PDSCH". The DCI scheduling a multi-PDSCH carrier may not always schedule more than one PDSCHs. The DCI may dynamically switch between scheduling one PDSCH and scheduling multiple PDSCHs.

In the embodiments of this disclosure, feedback information based on multi-PDSCH scheduling (i.e. feedback information for multiple PDSCHs) is transmitted from the terminal equipment to the network device at the same time.

In some embodiments, first DCI is used for scheduling based on multi-PDSCH, second DCI is used for scheduling based on single-PDSCH, and DCI formats of the first DCI and the second DCI are different.

For example, the multi-PDSCH carrier may be scheduled by different DCI formats, one DCI format (which is a newly-defined DCI format supporting multi-PDSCH) may indicate the scheduling based on multi-PDSCH, and another DCI format (which is a conventional DCI format, including DCI format 1_0, DCI format 1_1, and DCI format 1_2, etc.) may indicate the scheduling based on single-PDSCH. Supporting the conventional DCI format is beneficial to robustness and compatibility of the system. For example, fallback DCI (DCI format 1_0) may be used for scheduling when a channel condition is poor.

In some embodiments, a field in the DCI indicates the scheduling based on multi-PDSCH or the scheduling based on single-PDSCH.

For example, if the field of the DCI indicates multiple SLIVs and/or mapping types, indicating SLIVs and mapping types of multiple PDSCHs, the DCI indicates the scheduling based on multi-PDSCH. Even though the DCI format newly defined to support multi-PDSCH is used, a single PDSCH resource may be indicated in a row of the time domain resource allocation table configured by the RRC, multiple PDSCH resources are indicated in another row, and thereafter, different rows are dynamically indicated by the field in the DCI, so that flexible switch between the scheduling based on multi-PDSCH and the scheduling based on single-PDSCH may be performed.

For another example, if the DCI includes multiple new data indicators (NDIs) and/or redundancy version (RV) fields to indicate NDIs and RVs of multiple PDSCHs, the DCI indicates the scheduling based on multi-PDSCH.

In the embodiments of this disclosure, how the terminal equipment identifies the scheduling based on single-PDSCH and the scheduling based on multi-PDSCH is not limited. As described above, for example, terminal equipments may identify according to a DCI format. In receiving such conventional DCI formats as DCI format 1_0, DCI format 1_1, and DCI format 1_2, etc., the terminal equipment may learn that what is scheduled by the DCI is transmission based on single-PDSCH, and in receiving the DCI format newly defined to support multi-PDSCH, the terminal equipment may learn that what is scheduled by the DCI is transmission based on multi-PDSCH. For another example, the terminal equipment may determine according to a field of the DCI, distinguishing the scheduling based on single-PDSCH and the scheduling based on multi-PDSCH via specific signaling contents of the DCI. For a further example, the terminal equipment may also identify based on a combination of the above two modes.

FIG. 3 is an exemplary diagram of carrier aggregation of the embodiment of this disclosure. As shown in FIG. 3, a component carrier (CC) of the carrier aggregation includes:

a single-PDSCH carrier set C0: carriers in C0 are not configured with CBG-based transmission; in other words, the carriers are not enabled for CBG-based transmission; for the sake of simplicity, "is not enabled for CBG-based transmission" is referred to as "TB-based scheduling", and "is enabled for CBG-based transmission" is referred to as "CBG-based scheduling"; for carrier c in set C0, $N_{TB\_max,c}$ denotes a maximum number of TBs that carrier c is able to support; and according to the NR standards, $1 \leq N_{TB\_max,c} \leq 2$;

a single-PDSCH carrier set C1: carriers in C1 are configured with CBG-based transmission, referred to as CBG-based scheduling; for carrier c in set C1, $N_{TB\_max,c}$ denotes a maximum number of TBs that carrier c is able to support, and $N_{CBG\_max\_TB,c}$ denotes a maximum number of CBGs that each TB in carrier c is able to support; and according to the NR standards, $2 \leq N_{TB\_max,c} \times N_{CBG\_max\_TB,c} \leq 8$;

a multi-PDSCH carrier set C2: carriers in C2 are not configured with CBG-based transmission, referred to as TB-based scheduling; for carrier c in set C2, $N_{TB\_max,c}$ denotes a maximum number of TBs that each PDSCH in carrier c is able to support, and $N_{multi\_PDSCH\_max,c}$, denotes a maximum number of PDSCHs that a piece of DCI is able to schedule that carrier c is able to support; for the sake of simplicity, $N_{TB\_max,c}$ is also referred to as a maximum number of TBs that carrier c is able to support;

a multi-PDSCH carrier set C3: carriers in C3 are configured with CBG-based transmission, referred to as CBG-based scheduling; for carrier c in set C3, $N_{TB\_max,c}$ denotes a maximum number of TBs that each PDSCH in carrier c is able to support, $N_{CBG\_max\_TB,c}$ denotes a maximum number of CBGs that each TB in carrier c is able to support, and $N_{multi\_PDSCH\_max,c}$ denotes a maximum number of PDSCHs that a piece of DCI is able to schedule that carrier c is able to support; for the sake of simplicity, $N_{TB\_max,c}$ is also referred to as a maximum number of TBs that carrier c is able to support.

The carrier aggregation in FIG. 3 includes all types of carriers. When a certain type of carriers does not exist, the carrier aggregation becomes a special case of FIG. 3.

In the embodiments of this disclosure, PDSCHs may only be scheduled based on TBs for carriers that are "TB-based scheduling" (that is, carriers based on CBG transmission are not enabled). And PDSCHs may be scheduled based on CBG or may be scheduled based on TBs for carriers that are "CBG-based scheduling" (that is, carriers based on CBG transmission are enabled). "The TB-based scheduling" may be replaced with "scheduling in a TB mode"; and "the CBG-based scheduling" may be replaced with "scheduling in a CBG mode".

The multi-PDSCH and single-PDSCH are schematically described above, and the embodiments of this disclosure shall be further described below. In the following description, transmitting or receiving a PDCCH may be understood as transmitting or receiving downlink control information carried by the PDCCH, and transmitting or receiving a PDSCH may be understood as transmitting or receiving downlink data carried by the PDSCH.

Embodiments of a First Aspect

The embodiments of this disclosure provide a method for transmitting feedback information, which shall be described from a terminal equipment.

FIG. 4 is a schematic diagram of the method for transmitting feedback information of the embodiment of this disclosure. As shown in FIG. 4, the method includes:

401: a terminal equipment receives downlink control information transmitted by a network device;

402: the terminal equipment receives one or more physical downlink shared channels transmitted by the network device according to the downlink control information; and

403: the terminal equipment feeds back feedback information for the physical downlink shared channels to the network device;

wherein feedback information for physical downlink shared channels on a multi-PDSCH carrier is included in at least two sub-codebooks, and one of the sub-codebooks includes feedback information for the following physical downlink shared channel that: the physical downlink shared channel is scheduled on a multi-PDSCH carrier based on single-PDSCH and transport block (TB).

It should be noted that FIG. 4 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 4.

In some embodiments, the HARQ-ACK codebook includes a first sub-codebook, a second sub-codebook and a third sub-codebook.

In some embodiments, the first sub-codebook includes feedback information for the following PDSCHs: the physical downlink shared channel is scheduled based on a transport block on a single physical downlink shared channel carrier, and/or the physical downlink shared channel is scheduled based on a single physical downlink shared channel and a transport block on a multi-physical downlink shared channel carrier.

That is, the first sub-codebook includes HARQ-ACK for the following PDSCHs:

a PDSCH scheduled on a single-PDSCH carrier in the TB mode; and a PDSCH scheduled on a multi-PDSCH carrier in the single-PDSCH mode and the TB mode.

FIG. 5 is an exemplary diagram of the first sub-codebook of the embodiment of this disclosure, showing a case of a carrier set divided according to FIG. 3. As shown in FIG. 5, the first sub-codebook includes HARQ-ACK for the following PDSCHs:

a PDSCH scheduled on a carrier of set C0;

a PDSCH scheduled on a carrier of set C1 in the TB mode;

a PDSCH scheduled on a carrier of set C2 in the single-PDSCH mode; and a PDSCH scheduled on a carrier of set C3 in the single-PDSCH mode and the TB mode.

In the embodiments of this disclosure, if a carrier related to the above determination of the sub-codebooks does not exist, the sub-codebooks naturally do not include the HARQ-ACK related to the carrier. For example, carriers of the carrier aggregation may possibly not include C0 and C1, and at this case, the first sub-codebook does not include HARQ-ACK related to C0 and C1. For another example, carriers of the carrier aggregation may possibly not include C3, and at this case, the first sub-codebook does not include HARQ-ACK related to C3. Similar cases will not be enumerated herein any further.

In some embodiments, the first sub-codebook includes feedback information for at least one of the following information on the single physical downlink shared channel carrier and/or the multi-physical downlink shared channel carrier: semi-persistently scheduling physical downlink shared channel release (SPS PDSCH release), semi-persistently scheduling physical downlink shared channel (SPS PDSCH reception), or downlink control information indicating that a secondary cell is dormant (DCI indicating SCell dormancy).

For example, the first sub-codebook may also include HARQ-ACK for the following information:

semi-persistently scheduling physical downlink shared channel release (SPS PDSCH release);

semi-persistently scheduling physical downlink shared channel (SPS PDSCH);

DCI indicating that a secondary cell is dormant (DCI indicating SCell dormancy).

For example, the DCI may indicate SPS PDSCH release, and HARQ-ACK for the DCI is included in the first sub-codebook. The SPS PDSCH may possibly have no DCI scheduling associated therewith, and HARQ-ACK for the SPS PDSCH is included in the first sub-codebook. The DCI may indicate that a secondary cell is dormant, for example, DCI format 1_1 indicates that the secondary cell is dormant, and the HARQ-ACK for the DCI is included in the first sub-codebook. If information related to the above determination of sub-codebooks does not exist, the sub-codebooks naturally do not include HARQ-ACK related to the information.

In some embodiments, the number of bits of feedback information for one time of downlink scheduling in the first sub-codebook is $$N_{max} = \max_c \{N_{TB\_max,c}\},$$

carrier c is a carrier capable of generating feedback information in the first sub-codebook, and $N_{TB\_max,c}$ is a maximum number of transport blocks (TB) that carrier c is able to support.

For example, for each time of possible PDSCH scheduling in the first sub-codebook, it is assumed that its corresponding HARQ-ACK bit number is $$N_{max} = \max_{c \in C_0 \cup C_1 \cup C_2 \cup C_3} \{N_c\};$$

where, $N_c = N_{TB\_max,c}$. In other words, the number of HARQ-ACK bits is increased by $N_{max}$ bits in each time of increase of a value of the counter DAI or the total DAI by 1. Reserving a maximum possible number of HARQ-ACK bits may avoid different interpretations of sizes of the HARQ-ACK codebooks by the terminal equipment and network device in miss-detection of the DCI.

In some embodiments, the second sub-codebook includes feedback information for the following physical downlink shared channels: the physical downlink shared channel is scheduled based on a code block group (CBG) on a single physical downlink shared channel carrier, and/or the physical downlink shared channel is scheduled based on a single physical downlink shared channel and a code block group (CBG) on a multi-physical downlink shared channel carrier.

That is, the second sub-codebook includes HARQ-ACK for the following PDSCHs:

a PDSCH scheduled on the single-PDSCH carrier in the CBG mode;

a PDSCH scheduled on a multi-PDSCH carrier in the single-PDSCH mode and the CBG mode.

FIG. 6 is an exemplary diagram of the second sub-codebook of the embodiment of this disclosure, showing a case of a carrier set divided according to FIG. 3. As shown in FIG. 6, the second sub-codebook includes HARQ-ACK for the following PDSCHs:

a PDSCH scheduled on a carrier of set C1 in the CBG mode;

a PDSCH scheduled on a carrier of set C3 in the single-PDSCH mode and the CBG mode.

In the embodiments of this disclosure, if PDSCH scheduling related to the above determination of the sub-codebooks does not exist, the sub-codebooks naturally do not include the HARQ-ACK related to the PDSCH. For example, if carriers of C3 do not support a PDSCH scheduled in the single-PDSCH mode and the CBG mode, the second sub-codebook does not include HARQ-ACK related to the PDSCH.

In some embodiments, the number of bits of feedback information for one time of downlink scheduling in the second sub-codebook is $$N_{max} = \max_c \{N_{TB\_max,c} \times N_{CBG\_max\_TB,c}\},$$

carrier c is a carrier capable of generating feedback information in the second sub-codebook, $N_{TB\_max,c}$ is a maximum number of transport blocks (TB) that carrier c is able to support, and $N_{CBG\_max\_TB,c}$ is a maximum number of code block groups (CBGs) that each transport block (TB) on carrier c is able to support.

For example, for each time of possible PDSCH scheduling in the second sub-codebook, it is assumed that its corresponding HARQ-ACK bit number is $$N_{max} = \max_{c \in C_1 \cup C_3} \{N_c\};$$

where, $N_c = N_{TB\_max,c} \times N_{CBG\_max\_TB,c}$.

In some embodiments, the third sub-codebook includes feedback information for the following physical downlink shared channels: the physical downlink shared channel is scheduled based on a multi-physical downlink shared channel on a multi-physical downlink shared channel carrier.

That is, the third sub-codebook includes HARQ-ACK for the following PDSCH:

a PDSCH scheduled on the multi-PDSCH carrier in the multi-PDSCH mode.

FIG. 7 is an exemplary diagram of a third sub-codebook of an embodiment of this disclosure, showing a case of a carrier set divided according to FIG. 3. As shown in FIG. 7, the third sub-codebook includes HARQ-ACK for the following PDSCHs:

a PDSCH scheduled on a carrier of set C2 in the multi-PDSCH mode;

a PDSCH scheduled on a carrier of set C3 in the multi-PDSCH mode.

For the PDSCH scheduled based on multi-PDSCH on the carrier of set C3, it includes a PDSCH scheduled based on multi-PDSCH and CBG, and also includes a PDSCH scheduled based on multi-PDSCH and TB. If a type of PDSCH does not exist, the sub-codebook does not include HARQ-ACK for the PDSCH. For example, if the carrier in the set C3 does not support scheduling based on multi-PDSCH and TB, the sub-codebook does not include HARQ-ACK for the scheduling.

In some embodiments, the number of bits of feedback information for one time of downlink scheduling in the third sub-codebook is $$N_{max} = \max_c \{N_c\},$$

and carrier c is a carrier capable of generating feedback information in the third sub-codebook;

for carrier c not enabled for transmission based on a code block group, $N_c = N_{TB\_max,c} \times N_{multi\_PDSCH\_max,c}$; and for carrier c enabled for transmission based on a code block group, $N_c = N_{TB\_max,c} \times N_{CBG\_max\_TB,c} \times N_{multi\_PDSCH\_max,c}$;

$N_{TB\_max,c}$ is a maximum number of transport blocks (TBs) that carrier c is able to support, $N_{CBG\_max\_TB,c}$ is a maximum number of code block groups (CBGs) that each transport block (TB) on carrier c is able to support, and $N_{multi\_PDSCH\_max,c}$ is a maximum number of physical downlink shared channels on carrier c that the downlink control information (DCI) is able to schedule.

For example, for each time of possible PDSCH scheduling in the third sub-codebook, it is assumed that its corresponding HARQ-ACK bit number is $$N_{max} = \max_{c \in C_2 \cup C_3} \{N_c\}.$$

For carrier c in set C2, $N_c = N_{TB\_max,c} \times N_{multi\_PDSCH\_max,c}$ And for carrier c in set C3, $N_c = N_{TB\_max,c} \times N_{CBG\_max\_TB,c} \times N_{multi\_PDSCH\_max,c}$.

In the embodiments of this disclosure, the counter DAI and total DAI are independently counted in each sub-codebook. The HARQ-ACK codebook transmitted by the terminal equipment to the network device is obtained by cascading the above sub-codebooks. An order of cascading the sub-codebooks is not limited in the embodiments of this disclosure, for example, they may be cascaded in an order of the first sub-codebook, the second sub-codebook and the third sub-codebook. Therefore, by dividing the sub-codebook, the size of the Type 2 HARQ-ACK codebook may be reduced, and HARQ-ACK feedback overhead may be lowered.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that for the carrier enabled for multi-PDSCH scheduling, multiple sub-codebooks are generated based on whether to use multi-PDSCH scheduling and/or whether to use CBG transmission, etc. Hence, not only feedback based on multi-PDSCH may be supported, but also the size of Type 2 HARQ-ACK codebook may be reduced and feedback overhead of HARQ-ACK may be lowered by dividing the sub-codebooks.

Embodiments of a Second Aspect

On the basis of the embodiments of the first aspect, the embodiments of this disclosure shall be continued to be explained from a terminal equipment, with contents identical to those in the embodiments of the first aspect being not going to be repeated herein any further.

In some embodiments, an HARQ-ACK codebook may include a first sub-codebook and a second sub-codebook.

In some embodiments, the first sub-codebook includes feedback information for the following PDSCHs: the physical downlink shared channel is scheduled based on a transport block on a single physical downlink shared channel carrier, and/or the physical downlink shared channel is scheduled based on a single physical downlink shared channel and a transport block on a multi-physical downlink shared channel carrier.

That is, the first sub-codebook includes HARQ-ACK for the following PDSCHs:

a PDSCH scheduled on a single-PDSCH carrier in the TB mode;

a PDSCH scheduled on a multi-PDSCH carrier in the single-PDSCH mode and the TB mode.

In some embodiments, the second sub-codebook includes feedback information for the following physical downlink shared channels: the physical downlink shared channel is scheduled based on a code block group (CBG) on a single physical downlink shared channel carrier, and/or the physical downlink shared channel is scheduled based on a single physical downlink shared channel and a code block group (CBG) on a multi-physical downlink shared channel carrier, and/or the physical downlink shared channel is scheduled based on a multi-physical downlink shared channel on a multi-physical downlink shared channel carrier.

That is, the second sub-codebook includes HARQ-ACK for the following PDSCHs:

a PDSCH scheduled on the single-PDSCH carrier in the CBG mode;

a PDSCH scheduled on a multi-PDSCH carrier in the single-PDSCH mode and the CBG mode;

a PDSCH scheduled on a multi-PDSCH carrier in the multi-PDSCH mode.

FIG. 8 is another exemplary diagram of the second sub-codebook of the embodiment of this disclosure, showing a case of a carrier set divided according to FIG. 3. As shown in FIG. 8, the second sub-codebook includes HARQ-ACK for the following PDSCHs:

a PDSCH scheduled on a carrier of set C1 in the CBG mode;

a PDSCH scheduled on a carrier of set C2 in the multi-PDSCH mode;

a PDSCH scheduled on a carrier of the set C3 in the single-PDSCH mode and the CBG mode, and a PDSCH scheduled on the carrier of the set C3 in the multi-PDSCH mode.

In some embodiments, the number of bits of feedback information for one time of downlink scheduling in the second sub-codebook is $$N_{max} = \max_c \{N_c\},$$

and carrier c is a carrier capable of generating feedback information in the second sub-codebook;

for single physical downlink shared channel carrier c enabled for transmission based on a code block group, $N_c = N_{TB\_max,c} \times N_{CBG\_max\_TB,c}$; and for multiple physical downlink shared channel carrier c not enabled for transmission based on a code block group, $N_c = N_{TB\_max,c} \times N_{multi\_PDSCH\_max,c}$; and for multiple physical downlink shared channel carrier c enabled for transmission based on a code block group, $N_c = N_{TB\_max,c} \times N_{CBG\_max\_TB,c} \times N_{multi\_PDSCH\_max,c}$;

$N_{TB\_max,c}$ is a maximum number of transport blocks (TBs) that carrier c is able to support, $N_{CBG\_max\_TB,c}$ is a maximum number of code block groups (CBGs) that each transport block (TB) on carrier c is able to support, and $N_{multi\_PDSCH\_max,c}$ is a maximum number of physical downlink shared channels on carrier c that the downlink control information (DCI) is able to schedule.

For example, for each time of possible PDSCH scheduling in the second sub-codebook, it is assumed that its corresponding HARQ-ACK bit number is $$N_{max} = \max_{c \in C_1 \cup C_2 \cup C_3} \{N_c\}.$$

For carrier c in set C1, $N_c = N_{TB\_max,c} \times N_{CBG\_max\_TB,c}$. For carrier c in set C2, $N_c = N_{TB\_max,c} \times N_{multi\_PDSCH\_max,c}$ And for carrier c in set C3, $N_c = N_{TB\_max,c} \times N_{CBG\_max\_TB,c} \times N_{multi\_PDSCH\_max,c}$.

In the embodiments of this disclosure, the counter DAI and total DAI are independently counted in each sub-codebook. The HARQ-ACK codebook transmitted by the terminal equipment to the network device is obtained by cascading the above sub-codebooks. An order of cascading the sub-codebooks is not limited in the embodiments of this disclosure, for example, they may be cascaded in an order of the first sub-codebook and the second sub-codebook. Therefore, by dividing the sub-codebook, the size of the Type 2 HARQ-ACK codebook may be reduced, and HARQ-ACK feedback overhead may be lowered.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that for the carrier enabled for multi-PDSCH scheduling, multiple sub-codebooks are generated based on whether to use multi-PDSCH scheduling and/or whether to use CBG transmission, etc. Hence, not only feedback based on multi-PDSCH may be supported, but also the size of Type 2 HARQ-ACK codebook may be reduced and feedback overhead of HARQ-ACK may be lowered by dividing the sub-codebooks.

Embodiments of a Third Aspect

On the basis of the embodiments of the first and second aspects, the embodiments of this disclosure shall be continued to be explained from a terminal equipment, with contents identical to those in the embodiments of the first and second aspects being not going to be repeated herein any further.

In some embodiments, the HARQ-ACK codebook may include a first sub-codebook, a second sub-codebook and a third sub-codebook.

In some embodiments, the first sub-codebook includes feedback information for the following PDSCHs: the physical downlink shared channel is scheduled based on a transport block on a single physical downlink shared channel carrier, and/or the physical downlink shared channel is scheduled based on a single physical downlink shared channel and a transport block on a multi-physical downlink shared channel carrier.

That is, the first sub-codebook includes HARQ-ACK for the following PDSCHs:

a PDSCH scheduled on a single-PDSCH carrier in the TB mode;

a PDSCH scheduled on a multi-PDSCH carrier in the single-PDSCH mode and the TB mode.

Reference may be made to the first sub-codebook in the embodiments of the first aspect for details.

The second sub-codebook includes feedback information for the following physical downlink shared channel: the physical downlink shared channel is scheduled based on a code block group (CBG) on a single physical downlink shared channel carrier.

That is, the second sub-codebook includes HARQ-ACK for the following PDSCH:

a PDSCH scheduled on the single-PDSCH carrier in the CBG mode.

FIG. 9 is an exemplary diagram of the second sub-codebook of the embodiment of this disclosure, showing a case of a carrier set divided according to FIG. 3. As shown in FIG. 9, the second sub-codebook includes HARQ-ACK for the following PDSCH:

a PDSCH scheduled on a carrier of set C1 in the CBG mode.

In some embodiments, the number of bits of feedback information for one time of downlink scheduling in the second sub-codebook is link shared channels on carrier c that the downlink control information (DCI) is able to schedule.

For example, for each time of possible PDSCH scheduling in the third sub-codebook, it is assumed that its corresponding HARQ-ACK bit number is $$N_{max} = \max_{c \in C_2 \cup C_3} \{N_c\}.$$

$$N_{max} = \max_c \{N_{TB\_max,c} \times N_{CBG\_max\_TB,c}\},$$

carrier c is a carrier capable of generating feedback information in the second sub-codebook, $N_{TB\_max,c}$ is a maximum number of transport blocks (TB) that carrier c is able to support, and $N_{CBG\_max\_TB,c}$ is a maximum number of code block groups (CBGs) that each transport block (TB) on carrier c is able to support.

For example, for each time of possible PDSCH scheduling in the second sub-codebook, it is assumed that its corresponding HARQ-ACK bit number is $$N_{max} = \max_{c \in C_1} \{N_c\};$$

where, $N_c = N_{TB\_max,c} \times N_{CBG\_max\_TB,c}$.

In some embodiments, the third sub-codebook includes feedback information for the following physical downlink shared channels: the physical downlink shared channel is scheduled based on single-physical downlink shared channel and a code block group (CBG) on a multi-physical downlink shared channel carrier, and/or, the physical downlink shared channel is scheduled based on a multi-physical downlink shared channel on a multi-physical downlink shared channel carrier.

That is, the third sub-codebook includes HARQ-ACK for the following PDSCHs:

a PDSCH scheduled on the multi-PDSCH carrier in the single-PDSCH mode and the CBG mode;

a PDSCH scheduled on the multi-PDSCH carrier in the multi-PDSCH mode.

FIG. 10 is an exemplary diagram of the third sub-codebook of the embodiment of this disclosure, showing a case of a carrier set divided according to FIG. 3. As shown in FIG. 10, the third sub-codebook includes HARQ-ACK for the following PDSCHs:

a PDSCH scheduled on a carrier of set C2 in the multi-PDSCH mode;

a PDSCH scheduled on a carrier of set C3 in the single-PDSCH mode and the CBG mode and a PDSCH scheduled on a carrier of set C3 in the multi-PDSCH mode.

In some embodiments, the number of bits of feedback information for one time of downlink scheduling in the third sub-codebook is $$N_{max} = \max_c \{N_c\},$$

and carrier c is a carrier capable of generating feedback information in the third sub-codebook;

for multiple physical downlink shared channel carrier c not enabled for transmission based on a code block group, $N_c = N_{TB\_max,c} \times N_{multi\_PDSCH\_max,c}$; and for multiple physical downlink shared channel carrier c enabled for transmission based on a code block group, $N_c = N_{TB\_max,c} \times N_{CBG\_max\_TB,c} \times N_{multi\_PDSCH\_max,c}$;

$N_{TB\_max,c}$ is a maximum number of transport blocks (TBs) that carrier c is able to support, $N_{CBG\_max\_TB,c}$ is a maximum number of code block groups (CBGs) that each transport block (TB) on carrier c is able to support, and $N_{multi\_PDSCH\_max,c}$ is a maximum number of physical down- For carrier c in set C2, $N_c = N_{TB\_max,c} \times N_{multi\_PDSCH\_max,c}$
And for carrier c in set C3, $N_c = N_{TB\_max,c} \times N_{CBG\_max\_TB,c} \times N_{multi\_PDSCH\_max,c}$.

In the embodiments of this disclosure, the counter DAI and total DAI are independently counted in each sub-codebook. The HARQ-ACK codebook transmitted by the terminal equipment to the network device is obtained by cascading the above sub-codebooks. An order of cascading the sub-codebooks is not limited in the embodiment of this disclosure, for example, they may be cascaded in an order of the first sub-codebook, the second sub-codebook and the third sub-codebook. Therefore, by dividing the sub-codebook, the size of the Type 2 HARQ-ACK codebook may be reduced, and HARQ-ACK feedback overhead may be lowered.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that for the carrier enabled for multi-PDSCH scheduling, multiple sub-codebooks are generated based on whether to use multi-PDSCH scheduling and/or whether to use CBG transmission, etc. Hence, not only feedback based on multi-PDSCH may be supported, but also the size of Type 2 HARQ-ACK codebook may be reduced and feedback overhead of HARQ-ACK may be lowered by dividing the sub-codebooks.

Embodiments of a Fourth Aspect

On the basis of the embodiments of the first to the third aspects, the embodiments of this disclosure shall be continued to be explained from a terminal equipment, with contents identical to those in the embodiments of the first to the third aspects being not going to be repeated herein any further.

In some embodiments, feedback information for a first physical downlink shared channel and feedback information for a second physical downlink shared channel are in different sub-codebooks. The first physical downlink shared channel is scheduled on a multi-physical downlink shared channel (multi-PDSCH) carrier, and the second physical downlink shared channel is scheduled on a single-physical downlink shared channel (single-PDSCH) carrier.

In some embodiments, the HARQ-ACK codebook may include a first sub-codebook, a second sub-codebook and a third sub-codebook.

In some embodiments, the first sub-codebook includes feedback information for the following physical downlink shared channel: the physical downlink shared channel is scheduled on a single-physical downlink shared channel carrier based on a transport block (TB).

That is, the first sub-codebook includes HARQ-ACK for the following PDSCH:

a PDSCH scheduled on a single-PDSCH carrier in the TB mode.

FIG. 11 is an exemplary diagram of the first sub-codebook of the embodiment of this disclosure, showing a case of a carrier set divided according to FIG. 3. As shown in FIG. 11, the first sub-codebook includes HARQ-ACK for the following PDSCHs:

a PDSCH scheduled on a carrier of set C0;

a PDSCH scheduled on a carrier of set C1 in the TB mode.

For example, for each time of possible PDSCH scheduling in the first sub-codebook, it is assumed that its corresponding HARQ-ACK bit number is $$N_{max} = \max_{c \in C_0 \cup C_1} \{N_c\};$$

where, $N_c = N_{TB\_max,c}$.

In some embodiments, the second sub-codebook includes feedback information for the following physical downlink shared channel: the physical downlink shared channel is scheduled on a single-physical downlink shared channel carrier based on a code block group (CBG).

That is, the second sub-codebook includes HARQ-ACK for the following PDSCH:

a PDSCH scheduled on a single-PDSCH carrier in the CBG mode.

FIG. 12 is an exemplary diagram of the second sub-codebook of the embodiment of this disclosure, showing a case of a carrier set divided according to FIG. 3. As shown in FIG. 12, the second sub-codebook includes HARQ-ACK for the following PDSCH:

a PDSCH scheduled on a carrier of set C1 in the CBG mode.

For example, for each time of possible PDSCH scheduling in the second sub-codebook, it is assumed that its corresponding HARQ-ACK bit number is $$N_{max} = \max_{c \in C_1} \{N_c\};$$

where, $N_c = N_{TB\_max,c} \times N_{CBG\_max\_TB,c}$.

In some embodiments, the third sub-codebook includes feedback information for the following physical downlink shared channel: the physical downlink shared channel is scheduled on a multi-physical downlink shared channel carrier.

That is, the third sub-codebook includes HARQ-ACK for the following PDSCH:

a PDSCH scheduled on a multi-PDSCH carrier.

FIG. 13 is an exemplary diagram of the third sub-codebook of the embodiment of this disclosure, showing a case of a carrier set divided according to FIG. 3. As shown in FIG. 13, the third sub-codebook includes HARQ-ACK for the following PDSCHs:

a PDSCH scheduled on a carrier of set C2;

a PDSCH scheduled on a carrier of set C3.

For example, for each time of possible PDSCH scheduling in the third sub-codebook, it is assumed that its corresponding HARQ-ACK bit number is $$N_{max} = \max_{c \in C_2 \cup C_3} \{N_c\}.$$

For carrier c in set C2, $N_c = N_{TB\_max,c} \times N_{multi\_PDSCH\_max,c}$. And for carrier c in set C3, $N_c = N_{TB\_max,c} \times N_{CBG\_max\_TB,c} \times N_{multi\_PDSCH\_max,c}$.

In the embodiments of this disclosure, the counter DAI and total DAI are independently counted in each sub-codebook. The HARQ-ACK codebook transmitted by the terminal equipment to the network device is obtained by cascading the above sub-codebooks. An order of cascading the sub-codebooks is not limited in the embodiment of this disclosure, for example, they may be cascaded in an order of the first sub-codebook, the second sub-codebook and the third sub-codebook. Therefore, by dividing the sub-codebook, the size of the Type 2 HARQ-ACK codebook may be reduced, and HARQ-ACK feedback overhead may be lowered.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that for the carrier enabled for multi-PDSCH scheduling, multiple sub-codebooks are generated based on whether to use multi-PDSCH scheduling and/or whether to use CBG transmission, etc. Hence, not only feedback based on multi-PDSCH may be supported, but also the size of Type 2 HARQ-ACK codebook may be reduced and feedback overhead of HARQ-ACK may be lowered by dividing the sub-codebooks.

Embodiments of a Fifth Aspect

On the basis of the embodiments of the first to the fourth aspects, the embodiments of this disclosure shall be continued to be explained from a terminal equipment, with contents identical to those in the embodiments of the first to the fourth aspects being not going to be repeated herein any further.

In some embodiments, feedback information for a third physical downlink shared channel and feedback information for a fourth physical downlink shared channel are in different sub-codebooks. The third physical downlink shared channel is scheduled on a multi-physical downlink shared channel (multi-PDSCH) carrier based on a transport block (TB), and the fourth physical downlink shared channel is scheduled on a multi-physical downlink shared channel (multi-PDSCH) carrier based on a code block group (CBG).

In some embodiments, the HARQ-ACK codebook may include a first sub-codebook and a second sub-codebook.

In some embodiments, the first sub-codebook includes feedback information for the following physical downlink shared channels: the physical downlink shared channel is scheduled on a single-physical downlink shared channel carrier based on a transport block (TB), and/or, the physical downlink shared channel is scheduled on a multi-physical downlink shared channel carrier based on a transport block (TB).

That is, the first sub-codebook includes HARQ-ACK for the following PDSCHs:

a PDSCH scheduled on a single-PDSCH carrier in the TB mode;

a PDSCH scheduled on a multi-PDSCH carrier in the TB mode.

FIG. 14 is an exemplary diagram of the first sub-codebook of the embodiment of this disclosure, showing a case of a carrier set divided according to FIG. 3. As shown in FIG. 14, the first sub-codebook includes HARQ-ACK for the following PDSCHs:

a PDSCH scheduled on a carrier of set C0;
a PDSCH scheduled on a carrier of set C1 in the TB mode;
a PDSCH scheduled on a carrier of set C2;
a PDSCH scheduled on a carrier of set C3 in the TB mode.

For example, for each time of possible PDSCH scheduling in the first sub-codebook, it is assumed that its corresponding HARQ-ACK bit number is $$N_{max} = \max_{c \in C_0 \cup C_1 \cup C_2 \cup C_3} \{N_c\}.$$

For carrier c in sets C0 and C1, $N_c = N_{TB\_max,c}$. And for carrier c in sets C2 and C3, $N_c = N_{TB\_max,c} \times N_{multi\_PDSCH\_max,c}$.

In some embodiments, the second sub-codebook includes feedback information for the following physical downlink shared channels: the physical downlink shared channel is scheduled on a single-physical downlink shared channel carrier based on a code block group (CBG), and/or, the physical downlink shared channel is scheduled on a multi-physical downlink shared channel carrier based on a code block group (CBG).

That is, the second sub-codebook includes HARQ-ACK for the following PDSCHs:

a PDSCH scheduled on a single-PDSCH carrier in the CBG mode;
a PDSCH scheduled on a multi-PDSCH carrier in the CBG mode.

FIG. 15 is an exemplary diagram of the second sub-codebook of the embodiment of this disclosure, showing a case of a carrier set divided according to FIG. 3. As shown in FIG. 15, the second sub-codebook includes HARQ-ACK for the following PDSCHs:

a PDSCH scheduled on a carrier of set C1 in the CBG mode;
a PDSCH scheduled on a carrier of set C3 in the CBG mode.

For example, for each time of possible PDSCH scheduling in the second sub-codebook, it is assumed that its corresponding HARQ-ACK bit number is $$N_{max} = \max_{c \in C_1 \cup C_3} \{N_c\}.$$

For carrier c in set C1, $N_c = N_{TB\_max,c} \times N_{CBG\_max\_TB,c}$. And for carrier c in set C3, $N_c = N_{TB\_max,c} \times N_{CBG\_max\_TB,c} \times N_{multi\_PDSCH\_max,c}$.

In the embodiments of this disclosure, the counter DAI and total DAI are independently counted in each sub-codebook. The HARQ-ACK codebook transmitted by the terminal equipment to the network device is obtained by cascading the above sub-codebooks. An order of cascading the sub-codebooks is not limited in the embodiment of this disclosure, for example, they may be cascaded in an order of the first sub-codebook and the second sub-codebook. Therefore, by dividing the sub-codebook, the size of the Type 2 HARQ-ACK codebook may be reduced, and HARQ-ACK feedback overhead may be lowered.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that for the carrier enabled for multi-PDSCH scheduling, multiple sub-codebooks are generated based on whether to use multi-PDSCH scheduling and/or whether to use CBG transmission, etc. Hence, not only feedback based on multi-PDSCH may be supported, but also the size of Type 2 HARQ-ACK codebook may be reduced and feedback overhead of HARQ-ACK may be lowered by dividing the sub-codebooks.

Embodiments of a Sixth Aspect

The embodiments of this disclosure provide a method for receiving feedback information, which shall be described from a network device, with contents identical to those in the embodiments of the first to the fifth aspects being not going to be repeated herein any further.

FIG. 16 is a schematic diagram of the method for receiving feedback information of the embodiment of this disclosure. As shown in FIG. 16, the method includes:

1601: a network device transmits downlink control information to a terminal equipment;
1602: the network device transmits one or more physical downlink shared channels (PDSCHs) to the terminal equipment; and
1603: the network device receives feedback information for the physical downlink shared channels fed back by the terminal equipment.

It should be noted that FIG. 16 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 16.

In some embodiments, feedback information for physical downlink shared channels on a multi-physical downlink shared channel carrier is included in at least two sub-codebooks, and one of the sub-codebooks includes feedback information for the following physical downlink shared channel: the physical downlink shared channel is scheduled on a multi-physical downlink shared channel carrier based on single-physical downlink shared channel and transport block.

For example, the at least two sub-codebooks include:

a first sub-codebook; the first sub-codebook includes feedback information for the following physical downlink shared channels: the physical downlink shared channel is scheduled based on a transport block on a single physical downlink shared channel carrier, and/or the physical downlink shared channel is scheduled based on a single physical downlink shared channel and a transport block on a multi-physical downlink shared channel carrier;

a second sub-codebook; the second sub-codebook includes feedback information for the following physical downlink shared channels: the physical downlink shared channel is scheduled on a single-physical downlink shared channel carrier based on a code block group (CBG), and/or the physical downlink shared channel is scheduled on a multi-physical downlink shared channel carrier based on a single-physical downlink shared channel and a code block group (CBG); and a third sub-codebook; the third sub-codebook includes feedback information for the following physical downlink shared channel: the physical downlink shared channel is scheduled on a multi-physical downlink shared channel carrier based on a multi-physical downlink shared channel.

For another example, the at least two sub-codebooks include:

a first sub-codebook; the first sub-codebook includes feedback information for the following physical downlink shared channels: the physical downlink shared channel is scheduled based on a transport block on a single physical downlink shared channel carrier, and/or the physical downlink shared channel is scheduled based on a single physical downlink shared channel and a transport block on a multi-physical downlink shared channel carrier; and a second sub-codebook; the second sub-codebook includes feedback information for the following physical downlink shared channels: the physical downlink shared channel is scheduled on a single-physical downlink shared channel carrier based on a code block group (CBG), and/or the physical downlink shared channel is scheduled on a multi-physical downlink shared channel carrier based on a single-physical downlink shared channel and a code block group (CBG), and/or the physical downlink shared channel is scheduled on a multi-physical downlink shared channel carrier based on a multi-physical downlink shared channel.

For a further example, the at least two sub-codebooks include:

a first sub-codebook; the first sub-codebook includes feedback information for the following physical downlink shared channels: the physical downlink shared channel is scheduled based on a transport block on a single physical downlink shared channel carrier, and/or the physical downlink shared channel is scheduled based on a single physical downlink shared channel and a transport block on a multi-physical downlink shared channel carrier;

a second sub-codebook; the second sub-codebook includes feedback information for the following physical downlink shared channel: the physical downlink shared channel is scheduled on a single-physical downlink shared channel carrier based on a code block group (CBG); and a third sub-codebook; the third sub-codebook includes feedback information for the following physical downlink shared channels: the physical downlink shared channel is scheduled on a multi-physical downlink shared channel carrier based on a single-physical downlink shared channel and a code block group (CBG), and/or the physical downlink shared channel is scheduled on a multi-physical downlink shared channel carrier based on a multi-physical downlink shared channel.

In some embodiments, feedback information for a first physical downlink shared channel and feedback information for a second physical downlink shared channel are in different sub-codebooks. The first physical downlink shared channel is scheduled on a multi-physical downlink shared channel (multi-PDSCH) carrier, and the second physical downlink shared channel is scheduled on a single-physical downlink shared channel (single-PDSCH) carrier.

For example, the sub-codebook includes:

a first sub-codebook; the first sub-codebook includes feedback information for the following physical downlink shared channel: the physical downlink shared channel is scheduled based on a transport block on a single physical downlink shared channel carrier;

a second sub-codebook; the second sub-codebook includes feedback information for the following physical downlink shared channel: the physical downlink shared channel is scheduled on a single-physical downlink shared channel carrier based on a code block group (CBG); and a third sub-codebook; the third sub-codebook includes feedback information for the following physical downlink shared channel: the physical downlink shared channel is scheduled on a multi-physical downlink shared channel carrier.

In some embodiments, the feedback information for the third physical downlink shared channel and the feedback information for the fourth physical downlink shared channel are in different sub-codebooks. The third physical downlink shared channel is scheduled based on a transport block (TB) on a multi-physical downlink shared channel (multi-PDSCH) carrier, and the fourth physical downlink shared channel is scheduled based on a code block group (CBG) on a multi-physical downlink shared channel (multi-PDSCH) carrier.

For example, the sub-codebook includes:

a first sub-codebook; the first sub-codebook includes feedback information for the following physical downlink shared channels: the physical downlink shared channel is scheduled based on a transport block (TB) on a single physical downlink shared channel carrier, and/or, the physical downlink shared channel is scheduled based on a transport block (TB) on a multi-physical downlink shared channel carrier; and a second sub-codebook; the second sub-codebook includes feedback information for the following physical downlink shared channels: the physical downlink shared channel is scheduled based on a code block group (CBG) on a single-physical downlink shared channel carrier, and/or, the physical downlink shared channel is scheduled based on a code block group (CBG) on a multi-physical downlink shared channel carrier.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It can be seen from the above embodiments that for the carrier enabled for multi-PDSCH scheduling, multiple sub-codebooks are generated based on whether to use multi-PDSCH scheduling and/or whether to use CBG transmission, etc. Hence, not only feedback based on multi-PDSCH may be supported, but also the size of Type 2 HARQ-ACK codebook may be reduced and feedback overhead of HARQ-ACK may be lowered by dividing the sub-codebooks.

Embodiments of a Seventh Aspect

The embodiments of this disclosure provide an apparatus for transmitting feedback information. The apparatus may be, for example, a terminal equipment, or may be one or more components or assemblies configured in a terminal equipment, with contents identical to those in the embodiments of the first to the fifth aspects being not going to be described herein any further.

Figure 17:
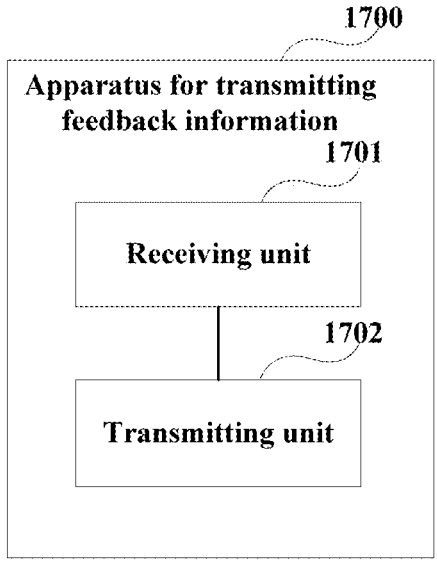
FIG. 17 is a schematic diagram of the apparatus for transmitting feedback information of an embodiment of this disclosure.

FIG. 17 is a schematic diagram of the apparatus for transmitting feedback information of the embodiment of this disclosure. As shown in FIG. 17, the apparatus 1700 for transmitting feedback information includes:

a receiving unit 1701 configured to receive downlink control information transmitted by a network device, and receive one or more physical downlink shared channels (PDSCHs) transmitted by the network device according to the downlink control information; and a transmitting unit 1702 configured to feed back feedback information for the physical downlink shared channels to the network device.

In some embodiments, feedback information for physical downlink shared channels on a multi-PDSCH carrier is included in at least two sub-codebooks, and one of the sub-codebooks includes feedback information for the following physical downlink shared channel that: the physical downlink shared channel is scheduled on a multi-PDSCH carrier based on single-PDSCH and transport block.

In some embodiments, first downlink control information is used for scheduling based on multi-PDSCH, second downlink control information is used for scheduling based on single-PDSCH, and downlink control information formats of the first downlink control information and the second downlink control information are different.

In some embodiments, the at least two sub-codebooks include a first sub-codebook, the first sub-codebook including feedback information for the following physical downlink shared channel that: the physical downlink shared channel is scheduled on a single-PDSCH carrier based on transport block, and/or, the physical downlink shared channel is scheduled on a multi-PDSCH carrier based on single-PDSCH and transport block.

In some embodiments, the first sub-codebook includes feedback information for at least one of the following on the single-PDSCH carrier and/or the multi-PDSCH carrier: semi-persistently scheduling physical downlink shared channel release, semi-persistently scheduling physical downlink shared channel, downlink control information indicating that a secondary cell is dormant.

In some embodiments, the number of bits of the feedback information for one time of downlink scheduling in the first sub-codebook is $$N_{max} = \max_c \{N_{TB\_max,c}\};$$

where, carrier c is a carrier able to generate the feedback information in the first sub-codebook, and $N_{TB\_max,c}$ is a maximum number of transport blocks able to be supported by the carrier c.

In some embodiments, the at least two sub-codebooks further include a second sub-codebook, the second sub-codebook including feedback information for the following physical downlink shared channel that: the physical downlink shared channel is scheduled on a single-PDSCH carrier based on code block group, and/or, the physical downlink shared channel is scheduled on a multi-PDSCH carrier based on single-PDSCH and a code block group.

In some embodiments, the number of bits of the feedback information for one time of downlink scheduling in the second sub-codebook is $$N_{max} = \max_c \{N_{TB\_max,c} \times N_{CBG\_max\_TB,c}\};$$

where, carrier c is a carrier able to generate the feedback information in the second sub-codebook, $N_{TB\_max,c}$ is a maximum number of transport blocks able to be supported by the carrier c, and $N_{CBG\_max\_TB,c}$ is a maximum number of code block groups able to be supported by each transport block on the carrier c.

In some embodiments, the at least two sub-codebooks further include a third sub-codebook, the third sub-codebook including feedback information for the following physical downlink shared channel that: the physical downlink shared channel is scheduled on a multi-PDSCH carrier based on multi-PDSCH.

In some embodiments, the number of bits of the feedback information for one time of downlink scheduling in the third sub-codebook is $$N_{max} = \max_c \{N_c\};$$

where, carrier c is a carrier able to generate the feedback information in the third sub-codebook, for a carrier c that is not enabled to be transmitted based on code block group, $N_c=N_{TB\_max,c} \times N_{multi\_PDSCH\_max,c}$, and for a carrier c that is enabled to be transmitted based on code block group, $N_c= N_{TB\_max,c} \times N_{CBG\_max\_TB,c} \times N_{multi\_PDSCH\_max,c}$;

where, $N_{TB\_max,c}$ is a maximum number of transport blocks able to be supported by the carrier c, $N_{CBG\_max\_TB,c}$ is a maximum number of code block groups able to be supported by each transport block on the carrier c, and $N_{multi\_PDSCH\_max,c}$ is a maximum number of physical downlink shared channels on the carrier c that is able to be scheduled by the downlink control information.

In some embodiments, the at least two sub-codebooks further include a second sub-codebook, the second sub-codebook including feedback information for the following physical downlink shared channel that: the physical downlink shared channel is scheduled on a single-PDSCH carrier based on code block group, and/or, the physical downlink shared channel is scheduled on a multi-PDSCH carrier based on single-PDSCH and code block group, and/or, the physical downlink shared channel is scheduled on a multi-PDSCH carrier based on multi-PDSCH.

In some embodiments, the number of bits of the feedback information for one time of downlink scheduling in the second sub-codebook is $$N_{max} = \max_c \{N_c\};$$

where, carrier c is a carrier able to generate the feedback information in the second sub-codebook, for a single-PDSCH carrier c that is enabled to be transmitted based on code block group, $N_c=N_{TB\_max,c} \times N_{CBG\_max\_TB,c}$, for a multi-PDSCH carrier c that is not enabled to be transmitted based on code block group, $N_c=N_{TB\_max,c} \times N_{multi\_PDSCH\_max,c}$, and for a multi-PDSCH carrier c that is enabled to be transmitted based on code block group, $N_c=N_{TB\_max,c} \times N_{CBG\_max\_TB,c} \times N_{multi\_PDSCH\_max,c}$;

where, $N_{TB\_max,c}$ is a maximum number of transport blocks able to be supported by the carrier c, $N_{CBG\_max\_TB,c}$ is a maximum number of code block groups able to be supported by each transport block on the carrier c, and $N_{multi\_PDSCH\_max,c}$ is a maximum number of physical downlink shared channels on the carrier c that is able to be scheduled by the downlink control information.

In some embodiments, the at least two sub-codebooks further include a second sub-codebook, the second sub-codebook including feedback information for the following physical downlink shared channel that: the physical downlink shared channel is scheduled based on code block group on a single-PDSCH carrier.

In some embodiments, the number of bits of feedback information for one time of downlink scheduling in the second sub-codebook is $$N_{max} = \max_c \{N_{TB\_max,c} \times N_{CBG\_max\_TB,c}\};$$

where, carrier c is a carrier that is able to generate the feedback information in the second sub-codebook, $N_{TB\_max,c}$ is a maximum number of transport blocks that the carrier c is able to support, and $N_{CBG\_max\_TB,c}$ is a maximum number of code block groups that is able to be supported by each transport block on the carrier c.

In some embodiments, the at least two sub-codebooks further include a third sub-codebook, the third sub-codebook including feedback information for the following physical downlink shared channel that: the physical downlink shared channel is scheduled on a multi-PDSCH carrier based on single-PDSCH and code block group, and/or, the physical downlink shared channel is scheduled on a multi-PDSCH carrier based on multi-PDSCH.

In some embodiments, the number of bits of the feedback information for one time of downlink scheduling in the third sub-codebook is $$N_{max} = \max_c \{N_c\};$$

where, carrier c is a carrier able to generate the feedback information in the third sub-codebook, for a multi-PDSCH carrier c that is not enabled to be transmitted based on code block group, $N_c = N_{TB\_max,c} \times N_{multi\_PDSCH\_max,c}$, for a multi-PDSCH carrier c that is enabled to be transmitted based on code block group, $N_c = N_{TB\_max,c} \times N_{CBG\_max\_TB,c} \times N_{multi\_PDSCH\_max,c}$;

where, $N_{TB\_max,c}$ is a maximum number of transport blocks able to be supported by the carrier c, $N_{CBG\_max\_TB,c}$ is a maximum number of code block groups able to be supported by each transport block on the carrier c, and $N_{multi\_PDSCH\_max,c}$ is a maximum number of physical downlink shared channels on the carrier c that is able to be scheduled by the downlink control information.

In some embodiments, feedback information for a first physical downlink shared channel and feedback information for a second physical downlink shared channel are in different sub-codebooks. The first physical downlink shared channel is scheduled on a multi-physical downlink shared channel (multi-PDSCH) carrier, and the second physical downlink shared channel is scheduled on a single-physical downlink shared channel (single-PDSCH) carrier.

In some embodiments, the sub-codebooks include:

a first sub-codebook; the first sub-codebook includes feedback information for the following physical downlink shared channel: the physical downlink shared channel is scheduled based on a transport block on a single physical downlink shared channel carrier;

a second sub-codebook; the second sub-codebook includes feedback information for the following physical downlink shared channel: the physical downlink shared channel is scheduled on a single-physical downlink shared channel carrier based on a code block group (CBG); and a third sub-codebook; the third sub-codebook includes feedback information for the following physical downlink shared channel: the physical downlink shared channel is scheduled on a multi-physical downlink shared channel carrier.

In some embodiments, feedback information for a third physical downlink shared channel and feedback information for a fourth physical downlink shared channel are in different sub-codebooks. The third physical downlink shared channel is scheduled on a multi-physical downlink shared channel carrier based on a transport block, and the fourth physical downlink shared channel is scheduled on a multi-physical downlink shared channel carrier based on a code block group.

In some embodiments, the sub-codebooks include:

a first sub-codebook; the first sub-codebook includes feedback information for the following physical downlink shared channels: the physical downlink shared channel is scheduled based on a transport block on a single physical downlink shared channel carrier, and/or the physical downlink shared channel is scheduled based on a transport block on a multi-physical downlink shared channel carrier; and a second sub-codebook; the second sub-codebook includes feedback information for the following physical downlink shared channels: the physical downlink shared channel is scheduled on a single-physical downlink shared channel carrier based on a code block group, and/or the physical downlink shared channel is scheduled on a multi-physical downlink shared channel carrier based on a code block group.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the apparatus 1700 for transmitting feedback information may further include other components or modules, and reference may be made to related techniques for particulars of these components or modules.

Furthermore, for the sake of simplicity, connection relationships between the components or modules or signal profiles thereof are only illustrated in FIG. 17. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that for the carrier enabled for multi-PDSCH scheduling, multiple sub-codebooks are generated based on whether to use multi-PDSCH scheduling and/or whether to use CBG transmission, etc. Hence, not only feedback based on multi-PDSCH may be supported, but also the size of Type 2 HARQ-ACK codebook may be reduced and feedback overhead of HARQ-ACK may be lowered by dividing the sub-codebooks.

Embodiments of an Eighth Aspect

The embodiments of this disclosure provide an apparatus for receiving feedback information. The apparatus may be, for example, a network device, or may be one or more components or assemblies configured in a network device, with contents identical to those in the embodiments of the sixth aspect being not going to be described herein any further.

Figure 18:
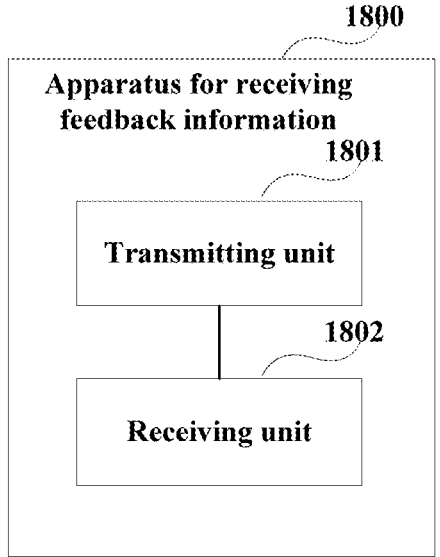
FIG. 18 is a schematic diagram of the apparatus for receiving feedback information of an embodiment of this disclosure.

FIG. 18 is a schematic diagram of the apparatus for receiving feedback information of the embodiment of this disclosure. As shown in FIG. 18, the apparatus 1800 for receiving feedback information includes:

a transmitting unit 1801 configured to transmit downlink control information to a terminal equipment, and transmit one or more physical downlink shared channels to the terminal equipment; and a receiving unit 1802 configured to receive feedback information for the physical downlink shared channels fed back by the terminal equipment.

In some embodiments, feedback information for physical downlink shared channels on a multi-PDSCH carrier is included in at least two sub-codebooks, and one of the sub-codebooks includes feedback information for the following physical downlink shared channel: the physical downlink shared channel is scheduled on a multi-PDSCH carrier based on single-PDSCH and transport block.

In some embodiments, feedback information for a first physical downlink shared channel and feedback information for a second physical downlink shared channel are in different sub-codebooks. The first physical downlink shared channel is scheduled on a multi-physical downlink shared channel (multi-PDSCH) carrier, and the second physical downlink shared channel is scheduled on a single-physical downlink shared channel (single-PDSCH) carrier.

In some embodiments, feedback information for a third physical downlink shared channel and feedback information for a fourth physical downlink shared channel are in different sub-codebooks. The third physical downlink shared channel is scheduled on a multi-physical downlink shared channel carrier based on a transport block, and the fourth physical downlink shared channel is scheduled on a multi-physical downlink shared channel carrier based on a code block group.

The above implementations only illustrate the embodiments of this disclosure. However, this disclosure is not limited thereto, and appropriate variants may be made on the basis of these implementations. For example, the above implementations may be executed separately, or one or more of them may be executed in a combined manner.

It should be noted that the components or modules related to this disclosure are only described above. However, this disclosure is not limited thereto, and the apparatus 1800 for receiving feedback information may further include other components or modules, and reference may be made to related techniques for particulars of these components or modules.

Furthermore, for the sake of simplicity, connection relationships between the components or modules or signal profiles thereof are only illustrated in FIG. 18. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that for the carrier enabled for multi-PDSCH scheduling, multiple sub-codebooks are generated based on whether to use multi-PDSCH scheduling and/or whether to use CBG transmission, etc. Hence, not only feedback based on multi-PDSCH may be supported, but also the size of Type 2 HARQ-ACK codebook may be reduced and feedback overhead of HARQ-ACK may be lowered by dividing the sub-codebooks.

Embodiments of a Ninth Aspect

The embodiments of this disclosure provide a communication system, and reference may be made to FIG. 1, with contents identical to those in the embodiments of the first to the eighth aspects being not going to be described herein any further.

In some embodiments, the communication system 100 may at least include:

a network device 101 configured to transmit downlink control information to a terminal equipment, transmit one or more physical downlink shared channels to the terminal equipment, and receive feedback information for the physical downlink shared channels fed back by the terminal equipment; and the terminal equipment 102 configured to receive the downlink control information transmitted by the network device, receive the physical downlink shared channels transmitted by the network device according to the downlink control information, and feed back feedback information for the physical downlink shared channels to the network device;

wherein feedback information for physical downlink shared channels on a multi-physical downlink shared channel carrier is included in at least two sub-codebooks, and one of the sub-codebooks includes feedback information for the following physical downlink shared channel: the physical downlink shared channel is scheduled on a multi-physical downlink shared channel carrier based on single-physical downlink shared channel and transport block.

In some embodiments, the communication system 100 may at least include:

a network device 101 configured to transmit downlink control information to a terminal equipment, transmit one or more physical downlink shared channels to the terminal equipment, and receive feedback information for the physical downlink shared channels fed back by the terminal equipment; and the terminal equipment 102 configured to receive the downlink control information transmitted by the network device, receive the physical downlink shared channels transmitted by the network device according to the downlink control information, and feed back feedback information for the physical downlink shared channels to the network device;

wherein feedback information for a first physical downlink shared channel and feedback information for a second physical downlink shared channel are in different sub-codebooks. The first physical downlink shared channel is scheduled on a multi-physical downlink shared channel carrier, and the second physical downlink shared channel is scheduled on a single-physical downlink shared channel carrier.

In some embodiments, the communication system 100 may at least include:

a network device 101 configured to transmit downlink control information to a terminal equipment, transmit one or more physical downlink shared channels to the terminal equipment, and receive feedback information for the physical downlink shared channels fed back by the terminal equipment; and the terminal equipment 102 configured to receive the downlink control information transmitted by the network device, receive the physical downlink shared channels transmitted by the network device according to the downlink control information, and feed back feedback information for the physical downlink shared channels to the network device;

wherein feedback information for a third physical downlink shared channel and feedback information for a fourth physical downlink shared channel are in different sub-codebooks. The third physical downlink shared channel is scheduled on a multi-physical downlink shared channel carrier based on a transport block, and the fourth physical downlink shared channel is scheduled on a multi-physical downlink shared channel carrier based on a code block group.

The embodiments of this disclosure further provide a network device, which may be, for example, a base station. However, this disclosure is not limited thereto, and it may also be another network device.

Figure 19:
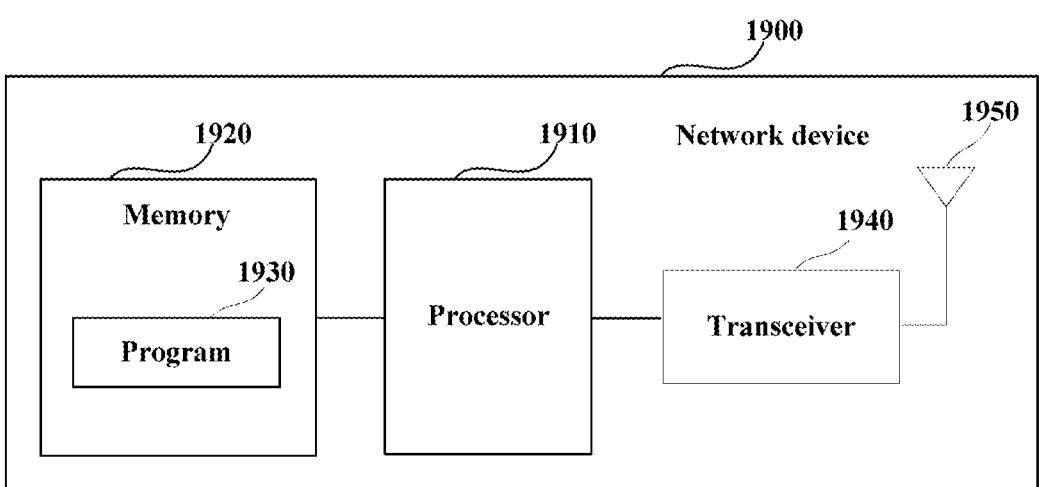
FIG. 19 is a schematic diagram of the network device of an embodiment of this disclosure.

FIG. 19 is a schematic diagram of a structure of the network device of the embodiment of this disclosure. As shown in FIG. 19, the network device 1900 may include a processor 1910 (such as a central processing unit (CPU)) and a memory 1920, the memory 1920 being coupled to the processor 1910. The memory 1920 may store various data, and furthermore, it may store a program 1930 for data processing, and execute the program 1930 under control of the processor 1910.

For example, the processor 1910 may be configured to execute a program to carry out the method for receiving feedback information as described in the embodiment of the sixth aspect. For example, the processor 1910 may be configured to execute the following control: transmitting downlink control information to a terminal equipment; transmitting one or more physical downlink shared channels to the terminal equipment; and receiving feedback information for the physical downlink shared channels fed back by the terminal equipment;

wherein feedback information for physical downlink shared channels on a multi-PDSCH carrier is included in at least two sub-codebooks, and one of the sub-codebooks includes feedback information for the following physical downlink shared channel: the physical downlink shared channel is scheduled on a multi-PDSCH carrier based on single-PDSCH and transport block;

or, feedback information for a first physical downlink shared channel and feedback information for a second physical downlink shared channel are in different sub-codebooks; the first physical downlink shared channel is scheduled on a multi-physical downlink shared channel (multi-PDSCH) carrier, and the second physical downlink shared channel is scheduled on a single-physical downlink shared channel (single-PDSCH) carrier;

or, feedback information for a third physical downlink shared channel and feedback information for a fourth physical downlink shared channel are in different sub-codebooks; the third physical downlink shared channel is scheduled on a multi-physical downlink shared channel carrier based on a transport block, and the fourth physical downlink shared channel is scheduled on a multi-physical downlink shared channel carrier based on a code block group.

Furthermore, as shown in FIG. 19, the network device 1900 may include a transceiver 1940, and an antenna 1950, etc. Functions of the above components are similar to those in the relevant art, and shall not be described herein any further. It should be noted that the network device 1900 does not necessarily include all the parts shown in FIG. 19, and furthermore, the network device 1900 may include parts not shown in FIG. 19, and the relevant art may be referred to.

The embodiments of this disclosure further provide a terminal equipment; however, this disclosure is not limited thereto, and it may also be another equipment.

Figure 20:
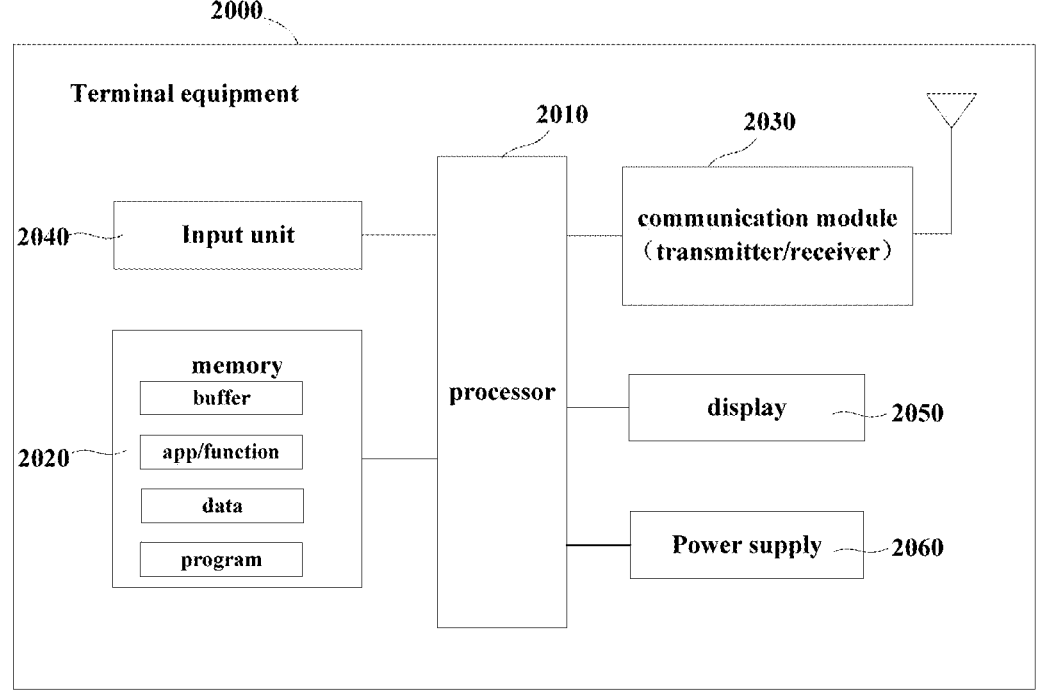
FIG. 20 is a schematic diagram of the terminal equipment of an embodiment of this disclosure.

FIG. 20 is a schematic diagram of the terminal equipment of the embodiment of this disclosure. As shown in FIG. 20, the terminal equipment 2000 may include a processor 2010 and a memory 2020, the memory 2020 storing data and a program and being coupled to the processor 2010. It should be noted that this figure is illustrative only, and other types of structures may also be used, so as to supplement or replace this structure and achieve a telecommunications function or other functions.

For example, the processor 2010 may be configured to execute a program to carry out the method for transmitting feedback information as described in the embodiments of the first to the fifth aspects. For example, the processor 2010 may be configured to perform the following control: receiving downlink control information transmitted by a network device, and receiving one or more physical downlink shared channels transmitted by the network device according to the downlink control information; and feeding back feedback information for the physical downlink shared channels to the network device;

wherein feedback information for physical downlink shared channels on a multi-PDSCH carrier is included in at least two sub-codebooks, and one of the sub-codebooks includes feedback information for the following physical downlink shared channel that: the physical downlink shared channel is scheduled on a multi-physical downlink shared channel carrier based on single-physical downlink shared channel and transport block;

or, feedback information for a first physical downlink shared channel and feedback information for a second physical downlink shared channel are in different sub-codebooks; the first physical downlink shared channel is scheduled on a multi-physical downlink shared channel (multi-PDSCH) carrier, and the second physical downlink shared channel is scheduled on a single-physical downlink shared channel (single-PDSCH) carrier;

or, feedback information for a third physical downlink shared channel and feedback information for a fourth physical downlink shared channel are in different sub-codebooks; the third physical downlink shared channel is scheduled on a multi-physical downlink shared channel carrier based on a transport block, and the fourth physical downlink shared channel is scheduled on a multi-physical downlink shared channel carrier based on a code block group.

As shown in FIG. 20, the terminal equipment 2000 may further include a communication module 2030, an input unit 2040, a display 2050, and a power supply 2060; functions of the above components are similar to those in the relevant art, which shall not be described herein any further. It should be noted that the terminal equipment 2000 does not necessarily include all the parts shown in FIG. 20, and the above components are not necessary. Furthermore, the terminal equipment 2000 may include parts not shown in FIG. 20, and the relevant art may be referred to.

An embodiment of this disclosure provides a computer readable program code, which, when executed in a terminal equipment, will cause the terminal equipment to carry out the method for transmitting feedback information as described in the embodiments of the first to the fifth aspects. An embodiment of this disclosure provides a computer readable medium, storing a computer readable program code, which will cause a terminal equipment to carry out the method for transmitting feedback information as described in the embodiments of the first to the fifth aspects.

An embodiment of this disclosure provides a computer readable program code, which, when executed in a network device, will cause the network device to carry out the method for receiving feedback information as described in the embodiments of the sixth aspect.

An embodiment of this disclosure provides a computer readable medium, storing a computer readable program code, which will cause a network device to carry out the method for receiving feedback information as described in the embodiments of the sixth aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to implementations containing the above embodiments, following supplements are further disclosed.

Supplement 1. A method for transmitting feedback information, comprising:

receiving, by a terminal equipment, downlink control information (DCI) transmitted by a network device;

receiving one or more physical downlink shared channels transmitted by the network device according to the downlink control information; and feeding back feedback information for the physical downlink shared channels to the network device;

wherein feedback information for physical downlink shared channels on a multi-physical downlink shared channel (multi-PDSCH) carrier is included in at least two sub-codebooks, and one of the sub-codebooks includes feedback information for the following physical downlink shared channel that: the physical downlink shared channel is scheduled on a multi-PDSCH carrier based on single-physical downlink shared channel (single-PDSCH) and transport block (TB).

Supplement 2. The method according to supplement 1, wherein first downlink control information is used for scheduling based on multi-PDSCH, second downlink control information is used for scheduling based on single-PDSCH, and downlink control information formats of the first downlink control information and the second downlink control information are different.

Supplement 3. The method according to supplement 1 or 2, wherein the at least two sub-codebooks comprise a first sub-codebook, the first sub-codebook comprising feedback information for the following physical downlink shared channel that: the physical downlink shared channel is scheduled on a single-PDSCH carrier based on transport block, and/or, the physical downlink shared channel is scheduled on a multi-PDSCH carrier based on single-PDSCH and transport block.

Supplement 4. The method according to supplement 3, wherein the first sub-codebook comprises feedback information for at least one of the following on the single-PDSCH carrier and/or the multi-PDSCH carrier: semi-persistently scheduling physical downlink shared channel release, semi-persistently scheduling physical downlink shared channel, downlink control information indicating that a secondary cell is dormant.

Supplement 5. The method according to supplement 3 or 4, wherein the number of bits of the feedback information for one time of downlink scheduling in the first sub-codebook is $$N_{max} = \max_c \{N_{TB\_max,c}\};$$

where, carrier c is a carrier able to generate the feedback information in the first sub-codebook, and $N_{TB\_max,c}$ is a maximum number of transport blocks able to be supported by the carrier c.

Supplement 6. The method according to any one of supplements 3-5, wherein the at least two sub-codebooks further comprise a second sub-codebook, the second sub-codebook comprising feedback information for the following physical downlink shared channel that: the physical downlink shared channel is scheduled on a single-PDSCH carrier based on code block group, and/or, the physical downlink shared channel is scheduled on a multi-PDSCH carrier based on single-PDSCH and code block group.

Supplement 7. The method according to supplement 6, wherein the number of bits of the feedback information for one time of downlink scheduling in the second sub-codebook is $$N_{max} = \max_c \{N_{TB\_max,c} \times N_{CBG\_max\_TB,c}\};$$

where, carrier c is a carrier able to generate the feedback information in the second sub-codebook, $N_{TB\_max,c}$ is a maximum number of transport blocks able to be supported by the carrier c, and $N_{CBG\_max\_TB,c}$ is a maximum number of code block groups able to be supported by each transport block on the carrier c.

Supplement 8. The method according to any one of supplements 3-7, wherein the at least two sub-codebooks further comprise a third sub-codebook, the third sub-codebook comprising feedback information for the following physical downlink shared channel that: the physical downlink shared channel is scheduled on a multi-PDSCH carrier based on multi-PDSCH.

Supplement 9. The method according to supplement 1, wherein the number of bits of the feedback information for one time of downlink scheduling in the third sub-codebook is $$N_{max} = \max_c \{N_c\};$$

where, carrier c is a carrier able to generate the feedback information in the third sub-codebook, for a carrier c that is not enabled to be transmitted based on code block group, $N_c = N_{TB\_max,c} \times N_{multi\_PDSCH\_max,c}$, and for a carrier c that is enabled to be transmitted based on code block group, $N_c = qjN_{TB\_max,c} \times N_{CBG\_max\_TB,c} \times N_{multi\_PDSCH\_max,c}$;

where, $N_{TB\_max,c}$ is a maximum number of transport blocks able to be supported by the carrier c, $N_{CBG\_max\_TB,c}$ is a maximum number of code block groups able to be supported by each transport block on the carrier c, and $N_{multi\_PDSCH\_max,c}$ is a maximum number of physical downlink shared channels on the carrier c that is able to be scheduled by the downlink control information.

Supplement 10. The method according to any one of supplements 3-5, wherein the at least two sub-codebooks further comprise a second sub-codebook, the second sub-codebook comprising feedback information for the following physical downlink shared channel that: the physical downlink shared channel is scheduled on a single-PDSCH carrier based on code block group, and/or, the physical downlink shared channel is scheduled on a multi-PDSCH carrier based on single-PDSCH and code block group, and/or, the physical downlink shared channel is scheduled on a multi-PDSCH carrier based on multi-PDSCH.

Supplement 11. The method according to supplement 10, wherein the number of bits of the feedback information for one time of downlink scheduling in the second sub-codebook is $$N_{max} = \max_c \{N_c\};$$

where, carrier c is a carrier able to generate the feedback information in the second sub-codebook, for a single-PDSCH carrier c that is enabled to be transmitted based on code block group, $N_c = N_{TB\_max,c} \times N_{CBG\_max\_TB,c}$, for a multi-PDSCH carrier c that is not enabled to be transmitted based on code block group, $N_c = N_{TB\_max,c} \times N_{multi\_PDSCH\_max,c}$, and for a multi-PDSCH carrier c that is enabled to be transmitted based on code block group, $N_c = N_{TB\_max,c} \times N_{CBG\_max\_TB,c} \times N_{multi\_PDSCH\_max,c}$;

where, $N_{TB\_max,c}$ is a maximum number of transport blocks able to be supported by the carrier c, $N_{CBG\_max\_TB,c}$ is a maximum number of code block groups able to be supported by each transport block on the carrier c, and $N_{multi\_PDSCH\_max,c}$ is a maximum number of physical downlink shared channels on the carrier c that is able to be scheduled by the downlink control information.

Supplement 12. The method according to any one of supplements 3-5, wherein the at least two sub-codebooks further comprise a second sub-codebook, the second sub-codebook comprising feedback information for the following physical downlink shared channel that: the physical downlink shared channel is scheduled based on code block group on a single-PDSCH carrier.

Supplement 13. The method according to supplement 12, wherein the number of bits of feedback information for one time of downlink scheduling in the second sub-codebook is $$N_{max} = \max_c \{N_{TB\_max,c} \times N_{CBG\_max\_TB,c}\};$$

where, carrier c is a carrier that is able to generate the feedback information in the second sub-codebook, $N_{TB\_max,c}$ is a maximum number of transport blocks that the carrier c is able to support, and $N_{CBG\_max\_TB,c}$ is a maximum number of code block groups that is able to be supported by each transport block on the carrier c.

Supplement 14. The method according to supplement 12 or 13, wherein the at least two sub-codebooks further comprise a third sub-codebook, the third sub-codebook comprising feedback information for the following physical downlink shared channel that: the physical downlink shared channel is scheduled on a multi-PDSCH carrier based on single-PDSCH and code block group, and/or, the physical downlink shared channel is scheduled on a multi-PDSCH carrier based on multi-PDSCH.

Supplement 15. The method according to supplement 14, wherein the number of bits of the feedback information for one time of downlink scheduling in the third sub-codebook is $$N_{max} = \max_c \{N_c\};$$

where, carrier c is a carrier able to generate the feedback information in the third sub-codebook, for a multi-PDSCH carrier c that is not enabled to be transmitted based on code block group, $N_c = N_{TB\_max,c} \times N_{multi\_PDSCH\_max,c}$, for a multi-PDSCH carrier c that is enabled to be transmitted based on code block group, $N_c = N_{TB\_max,c} \times N_{CBG\_max\_TB,c} \times N_{multi\_PDSCH\_max,c}$;

where, $N_{TB\_max,c}$ is a maximum number of transport blocks able to be supported by the carrier c, $N_{CBG\_max\_TB,c}$ is a maximum number of code block groups able to be supported by each transport block on the carrier c, and $N_{multi\_PDSCH\_max,c}$ is a maximum number of physical downlink shared channels on the carrier c that is able to be scheduled by the downlink control information.

Supplement 16. A method for transmitting feedback information, comprising:

receiving, by a terminal equipment, downlink control information (DCI) transmitted by a network device;

according to the downlink control information, receiving one or more physical downlink shared channels (PD-SCHs) transmitted by the network device; and feeding back feedback information for the physical downlink shared channels to the network device;

wherein feedback information for a first physical downlink shared channel and feedback information for a second physical downlink shared channel are in different sub-codebooks, the first physical downlink shared channel being scheduled on a multi-physical downlink shared channel (multi-PDSCH) carrier, and the second physical downlink shared channel being scheduled on a single physical downlink shared channel (single-PDSCH) carrier.

Supplement 17. The method according to supplement 16, wherein the sub-codebooks comprise:

a first sub-codebook, the first sub-codebook comprising feedback information for the following physical downlink shared channel that: the physical downlink shared channel is scheduled on a single physical downlink shared channel carrier based on transport block (TB);

a second sub-codebook, the second sub-codebook comprising feedback information for the following physical downlink shared channel that: the physical downlink shared channel is scheduled on a single physical downlink shared channel carrier based on code block group (CBG);

a third sub-codebook, the third sub-codebook comprising feedback information for the following physical downlink shared channel that: the physical downlink shared channel is scheduled on a multi-physical downlink shared channel (multi-PDSCH) carrier.

Supplement 18. A method for transmitting feedback information, comprising:

receiving, by a terminal equipment, downlink control information (DCI) transmitted by a network device;

receiving one or more physical downlink shared channels (PDSCHs) transmitted by the network device according to the downlink control information; and feeding back feedback information for the physical downlink shared channels to the network device;

wherein feedback information for a third physical downlink shared channel and feedback information for a fourth physical downlink shared channel are in different sub-codebooks, the third physical downlink shared channel being scheduled based on transport block (TB) on a multi-physical downlink shared channel (multi-PDSCH) carrier, and the fourth physical downlink shared channel being scheduled based on code block group (CBG) on a multi-physical downlink shared channel (multi-PDSCH) carrier.

Supplement 19. The method according to supplement 18, wherein the sub-codebooks comprise:

a first sub-codebook, the first sub-codebook comprising feedback information for the following physical downlink shared channel that: the physical downlink shared channel is scheduled on a single physical downlink shared channel carrier based on transport block (TB), and/or, the physical downlink shared channel is scheduled on a multi-physical downlink shared channel carrier based on transport block (TB); and a second sub-codebook, the second sub-codebook comprising feedback information for the following physical downlink shared channel that: the physical downlink shared channel is scheduled on a single physical downlink shared channel carrier based on code block group (CBG), and/or, the physical downlink shared channel is scheduled on a multi-physical downlink shared channel carrier based on code block group (CBG).

Supplement 20. A method for receiving feedback information, comprising:

transmitting downlink control information by a network device to a terminal equipment;

transmitting one or more physical downlink shared channels (PDSCHs) to the terminal equipment; and receiving feedback information for the physical downlink shared channels fed back by the terminal equipment;

wherein feedback information for physical downlink shared channels on a multi-PDSCH carrier is included in at least two sub-codebooks, and one of the sub-codebooks includes feedback information for the following physical downlink shared channel: the physical downlink shared channel is scheduled on a multi-PDSCH carrier based on single-PDSCH and transport block.

Supplement 21. A method for receiving feedback information, comprising:

transmitting downlink control information (DCI) by a network device to a terminal equipment;

transmitting one or more physical downlink shared channels (PDSCHs) to the terminal equipment; and receiving feedback information for the physical downlink shared channels fed back by the terminal equipment;

wherein feedback information for a first physical downlink shared channel and feedback information for a second physical downlink shared channel are in different sub-codebooks; the first physical downlink shared channel is scheduled on a multi-physical downlink shared channel (multi-PDSCH) carrier, and the second physical downlink shared channel is scheduled on a single-physical downlink shared channel (single-PDSCH) carrier.

Supplement 22. A method for receiving feedback information, comprising:

transmitting downlink control information (DCI) by a network device to a terminal equipment;

transmitting one or more physical downlink shared channels (PDSCHs) to the terminal equipment; and receiving feedback information for the physical downlink shared channels fed back by the terminal equipment;

wherein feedback information for a third physical downlink shared channel and feedback information for a fourth physical downlink shared channel are in different sub-codebooks. The third physical downlink shared channel is scheduled on a multi-physical downlink shared channel carrier based on a transport block, and the fourth physical downlink shared channel is scheduled on a multi-physical downlink shared channel carrier based on a code block group.

Supplement 23. A terminal equipment, including a memory and a processor, the memory storing a computer program, and the processor being configured to execute the computer program to carry out the method for transmitting feedback information as described in any one of supplements 1-19.

Supplement 24. A network device, including a memory and a processor, the memory storing a computer program, and the processor being configured to execute the computer program to carry out the method for receiving feedback information as described in any one of supplements 20-22.

Supplement 25. A communication system, comprising:

a network device configured to transmit downlink control information to a terminal equipment, transmit one or more physical downlink shared channels to the terminal equipment, and receive feedback information for the physical downlink shared channels fed back by the terminal equipment; and the terminal equipment configured to receive the downlink control information transmitted by the network device, receive the physical downlink shared channels transmitted by the network device according to the downlink control information, and feed back feedback information for the physical downlink shared channels to the network device;

wherein feedback information for physical downlink shared channels on a multi-physical downlink shared channel carrier is included in at least two sub-codebooks, and one of the sub-codebooks includes feedback information for the following physical downlink shared channel: the physical downlink shared channel is scheduled on a multi-physical downlink shared channel carrier based on single-physical downlink shared channel and transport block.

Supplement 26. A communication system, comprising:

a network device configured to transmit downlink control information to a terminal equipment, transmit one or more physical downlink shared channels to the terminal equipment, and receive feedback information for the physical downlink shared channels fed back by the terminal equipment; and the terminal equipment configured to receive the downlink control information transmitted by the network device, receive the physical downlink shared channels transmitted by the network device according to the downlink control information, and feed back feedback information for the physical downlink shared channels to the network device;

wherein feedback information for a first physical downlink shared channel and feedback information for a second physical downlink shared channel are in different sub-codebooks. The first physical downlink shared channel is scheduled on a multi-physical downlink shared channel (multi-PDSCH) carrier, and the second physical downlink shared channel is scheduled on a single-physical downlink shared channel (single-PDSCH) carrier.

Supplement 27. A communication system, comprising:

a network device configured to transmit downlink control information to a terminal equipment, transmit one or more physical downlink shared channels to the terminal equipment, and receive feedback information for the physical downlink shared channels fed back by the terminal equipment; and the terminal equipment configured to receive the downlink control information transmitted by the network device, receive the physical downlink shared channels transmitted by the network device according to the downlink control information, and feed back feedback information for the physical downlink shared channels to the network device;

wherein feedback information for a third physical downlink shared channel and feedback information for a fourth physical downlink shared channel are in different sub-codebooks; the third physical downlink shared channel is scheduled on a multi-physical downlink shared channel carrier based on a transport block, and the fourth physical downlink shared channel is scheduled on a multi-physical downlink shared channel carrier based on a code block group.

The invention claimed is:

1. An apparatus for transmitting feedback information, comprising:

a receiver configured to receive downlink control information transmitted by a network device, and receive one or more physical downlink shared channels (PDSCHs) transmitted by the network device according to the downlink control information (DCI); and a transmitter configured to feed back feedback information for the physical downlink shared channels to the network device;

wherein feedback information for multiple physical downlink shared channels on a multi-PDSCH cell is included in two sub-codebooks, and one of the sub-codebooks includes feedback information for a first physical downlink shared channel that is scheduled on the multi-PDSCH cell based on single-PDSCH scheduling and based on transport block;

wherein that the physical downlink shared channel is scheduled on the multiple-PDSCH cell based on the single-PDSCH and the transport block at least refers to DCI indicates a first row containing one SLIV (Start and Length Indicator Value) in a configured time domain resource allocation table, wherein the table includes at least a second row containing more than one SLIV and the first row.

2. The apparatus according to claim 1, wherein first downlink control information is used for a multi-PDSCH scheduling, second downlink control information is used for a single-PDSCH scheduling, and downlink control information formats of the first downlink control information and the second downlink control information are different.

3. The apparatus according to claim 1, wherein the two sub-codebooks comprise a first sub-codebook, the first sub-codebook comprising feedback information for the following physical downlink shared channel that: the physical downlink shared channel is scheduled on a single-PDSCH cell based on transport block, and, the first physical downlink shared channel is scheduled on a multi-PDSCH cell based on a single-PDSCH scheduling and based on transport block.

4. The apparatus according to claim 3, wherein the first sub-codebook comprises feedback information for at least one of the following on the single-PDSCH cell and/or the multi-PDSCH cell: semi-persistently scheduling physical downlink shared channel release, semi-persistently scheduling physical downlink shared channel, or downlink control information indicating that a secondary cell is dormant.

5. The apparatus according to claim 3, wherein the number of bits of the feedback information for the downlink control information in the first sub-codebook is $$N_{max} = \max_{c}\{N_{TB\_max,c}\};$$

where cell c is a cell able to generate the feedback information in the first sub-codebook, and $N_{TB\_max,c}$ is a maximum number of transport blocks able to be supported by the cell c.

6. The apparatus according to claim 3, wherein the two sub-codebooks further comprise a second sub-codebook, the second sub-codebook comprising feedback information for the following physical downlink shared channel that: the physical downlink shared channel is scheduled on a single-PDSCH cell based on code block group, and/or, the physical downlink shared channel is scheduled on a multi-PDSCH cell based on a single-PDSCH scheduling and based on code block group.

7. The apparatus according to claim 6, wherein the number of bits of the feedback information for the downlink control information in the second sub-codebook is $$N_{max} = \max_{c}\{N_{TB\_max,c} \times N_{CBG\_max\_TB,c}\};$$

where, cell c is a cell able to generate the feedback information in the second sub-codebook, $N_{TB\_max,c}$ is a maximum number of transport blocks able to be supported by the cell c, and $N_{CBG\_max\_TB,c}$ is a maximum number of code block groups able to be supported by each transport block on the cell c.

8. The apparatus according to claim 6, wherein the two sub-codebooks further comprise a third sub-codebook, the third sub-codebook comprising feedback information for the following physical downlink shared channel that: the physical downlink shared channel is scheduled on a multi-PDSCH cell based on a multi-PDSCH scheduling.

9. The apparatus according to claim 8, wherein the number of bits of the feedback information for the downlink control information in the third sub-codebook is $$N_{max} = \max_{c}\{N_c\};$$

where, cell c is a cell able to generate the feedback information in the third sub-codebook, for a cell c that is not enabled to be transmitted based on code block group, $N_c = N_{TB\_max,c} \times N_{multi\_PDSCH\_max,c}$, and for a cell c that is enabled to be transmitted based on code block group, $N_c = N_{TB\_max,c} \times N_{CBG\_max\_TB,c} \times N_{multi\_PDSCH\_max,c}$;

where, $N_{TB\_max,c}$ is a maximum number of transport blocks able to be supported by the cell c, $N_{CBG\_max\_TB,c}$ is a maximum number of code block groups able to be supported by each transport block on the cell c, and $N_{multi\_PDSCH\_max,c}$ is a maximum number of physical downlink shared channels on the cell c that is able to be scheduled by the downlink control information.

10. The apparatus according to claim 3, wherein the two sub-codebooks further comprise a second sub-codebook, the second sub-codebook comprising feedback information for the following physical downlink shared channel that: the physical downlink shared channel is scheduled on a multi-PDSCH cell based on a multi-PDSCH scheduling.

11. The apparatus according to claim 10, wherein the number of bits of the feedback information for the downlink control information in the second sub-codebook is $$N_{max} = \max_{c}\{N_c\};$$

where, cell c is a cell able to generate the feedback information in the second sub-codebook, for a multi-PDSCH cell c that is not enabled to be transmitted based on code block group, $N_c = N_{TB\_max,c} \times N_{multi\_PDSCH\_max,c}$;

where, $N_{TB\_max,c}$ is a maximum number of transport blocks able to be supported by the cell c, and $N_{multi\_PDSCH\_max,c}$ is a maximum number of physical downlink shared channels on the cell c that is able to be scheduled by the downlink control information.

12. The apparatus according to claim 3, wherein the two sub-codebooks further comprise a second sub-codebook, the second sub-codebook comprising feedback information for the following physical downlink shared channel that: a second physical downlink shared channel is scheduled based on code block group on a single-PDSCH cell.

13. The apparatus according to claim 12, wherein the number of bits of feedback information for one time of downlink scheduling in the second sub-codebook is $$N_{max} = \max_{c}\{N_{TB\_max,c} \times N_{CBG\_max\_TB,c}\};$$

where, cell c is a cell that is able to generate the feedback information in the second sub-codebook, $N_{TB\_max,c}$ is a maximum number of transport blocks that the cell c is able to support, and $N_{CBG\_max\_TB,c}$ is a maximum number of code block groups that is able to be supported by each transport block on the cell c.

14. The apparatus according to claim 12, wherein the two sub-codebooks further comprise a third sub-codebook, the third sub-codebook comprising feedback information for the following physical downlink shared channel that: the physical downlink shared channel is scheduled on a multi-PDSCH cell based on single-PDSCH and code block group, and/or, the physical downlink shared channel is scheduled on a multi-PDSCH cell based on multi-PDSCH.

15. The apparatus according to claim 14, wherein the number of bits of the feedback information for one time of downlink scheduling in the third sub-codebook is $$N_{max} = \max_c \{N_c\};$$

where, cell c is a cell able to generate the feedback information in the third sub-codebook, for a multi-PDSCH cell c that is not enabled to be transmitted based on code block group, $N_c = N_{TB\_max,c} \times N_{multi\_PDSCH\_max,c}$; for a multi-PDSCH cell c that is enabled to be transmitted based on code block group, $N_c = N_{TB\_max,c} \times N_{CBG\_max\_TB,c} \times N_{multi\_PDSCH\_max,c}$;

where, $N_{TB\_max,c}$ is a maximum number of transport blocks able to be supported by the cell c, $N_{CBG\_max\_TB,c}$ is a maximum number of code block groups able to be supported by each transport block on the cell c, and $N_{multi\_PDSCH\_max,c}$ is a maximum number of physical downlink shared channels on the cell c that is able to be scheduled by the downlink control information.

16. An apparatus for receiving feedback information, comprising:

a transmitter configured to transmit downlink control information to a terminal equipment, and transmit one or more physical downlink shared channels to the terminal equipment; and a receiver configured to receive feedback information for the one or more physical downlink shared channels fed back by the terminal equipment;

wherein feedback information for multiple physical downlink shared channels on a multi-PDSCH cell is included in two sub-codebooks, and one of the sub-codebooks includes feedback information for a first physical downlink shared channel that is scheduled on the multi-PDSCH cell based on a single-PDSCH scheduling and based on transport block;

wherein that the physical downlink shared channel is scheduled on the multiple-PDSCH cell based on the single-PDSCH and the transport block at least refers to DCI indicates a first row containing one SLIV (Start and Length Indicator Value) in a configured time domain resource allocation table, wherein the table includes at least a second row containing more than one SLIV and the first row.

17. A communication system, comprising:

a network device configured to transmit downlink control information to a terminal equipment, transmit one or more physical downlink shared channels to the terminal equipment, and receive feedback information for the one or more physical downlink shared channels fed back by the terminal equipment; and the terminal equipment configured to receive the downlink control information transmitted by the network device, receive one or more physical downlink shared channels transmitted by the network device according to the downlink control information, and feed back feedback information for the one or more physical downlink shared channels to the network device;

wherein feedback information for multiple physical downlink shared channels on a multi-PDSCH cell is included in two sub-codebooks, and one of the sub-codebooks includes feedback information for a first physical downlink shared channel that is scheduled on the multi-PDSCH cell based on a single-PDSCH scheduling and based on transport block;

wherein that the physical downlink shared channel is scheduled on the multiple-PDSCH cell based on the single-PDSCH and the transport block at least refers to DCI indicates a first row containing one SLIV (Start and Length Indicator Value) in a configured time domain resource allocation table, wherein the table includes at least a second row containing more than one SLIV and the first row.

* * * * *